(12) United States Patent
Robideau et al.

(10) Patent No.: US 11,506,618 B1
(45) Date of Patent: Nov. 22, 2022

(54) PORTABLE X-RAY BACKSCATTER INSPECTION OF JOINING FEATURES

(71) Applicant: The Boeing Company, Chicago, IL (US)

(72) Inventors: Jeffrey A. Robideau, Hood River, OR (US); Morteza Safai, Newcastle, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/444,811

(22) Filed: Aug. 10, 2021

(51) Int. Cl.
*G01N 23/203* (2006.01)
*G01N 23/20008* (2018.01)

(52) U.S. Cl.
CPC ..... *G01N 23/203* (2013.01); *G01N 23/20008* (2013.01); *G01N 2223/40* (2013.01); *G01N 2223/629* (2013.01)

(58) Field of Classification Search
None
See application file for complete search history.

(56) References Cited

U.S. PATENT DOCUMENTS

| | | | | |
|---|---|---|---|---|
| 9,036,781 | B1* | 5/2015 | Safai | G01N 23/203 378/86 |
| 11,340,361 | B1* | 5/2022 | Couture | G01T 1/208 |
| 2013/0287169 | A1* | 10/2013 | Liesenfelt | G21K 1/04 378/57 |
| 2017/0052125 | A1* | 2/2017 | Georgeson | G01N 23/20025 |
| 2019/0079028 | A1* | 3/2019 | Georgeson | G01N 23/02 |

\* cited by examiner

*Primary Examiner* — Hoon K Song
(74) *Attorney, Agent, or Firm* — Yee & Associates, P.C.

(57) ABSTRACT

Method, apparatus, system, and computer program product for inspecting a joining feature on an object. A portable housing with an x-ray system is moved along the joining feature on the object. The x-ray system is controlled to direct an x-ray beam through an opening in the portable housing to scan an area of the object containing the joining feature as the portable housing moves along the joining feature on the object. Sensor data generated from a backscatter detected by a sensor system is received. The backscatter is generated in response to the x-ray beam encountering the area of the object including the joining feature. A determination is made as to whether an inconsistency is present in the area of the object including the joining feature using the sensor data.

20 Claims, 13 Drawing Sheets

PORTABLE X-RAY BACKSCATTER INSPECTION OF JOINING FEATURES

BACKGROUND INFORMATION

1. Field

The present disclosure relates generally to inspection systems, and in particular, to backscatter inspection systems. Still more particularly, the present disclosure relates to a method, apparatus, and system for inspecting a joining feature on an object.

2. Background

Aircraft, ships, pipelines, and other objects are often manufactured by welding or bonding components together to form the full-sized structure. For example, welds at joints for aircraft parts such as skin panels and fuselage sections for an aircraft. Nondestructive inspections can be performed on welds at joints for these aircraft parts during manufacturing of the aircraft. These nondestructive inspections can also be performed during routine maintenance, upgrading, reconfiguration, or refurbishment of the aircraft.

Nondestructive inspection includes a number of different techniques that are used to evaluate properties of a material, a structure, or a system without causing damage. Nondestructive inspection can include techniques such as current testing, magnetic particle inspection, liquid penetrant inspection, radiography, ultrasonic testing, and visual testing.

For example, nondestructive inspection that can be performed on welds at joints in aircraft include through transmission x-ray and phase array ultrasound techniques. These types of inspections can be performed using scanning systems and robots. The complexity of aircraft can make performing nondestructive inspections using transmission x-ray and phase array ultrasound techniques difficult.

Therefore, it would be desirable to have a method and apparatus that take into account at least some of the issues discussed above, as well as other possible issues. For example, it would be desirable to have a method and apparatus that overcome a technical problem with inspecting welds or other features at joints in objects such as an aircraft.

SUMMARY

An embodiment of the present disclosure provides an x-ray scanning system comprising a portable housing, a mobility system, an x-ray system, a set of sensor panels, and a controller. The portable housing has a chamber and a radiation shield. The mobility system is connected to the portable housing and attaches the portable housing to a surface of an object. The x-ray system is connected to the portable housing within the chamber and is configured to emit an x-ray beam through an opening in the portable housing. The set of sensor panels is located within the chamber. The set of sensor panels is moveable to a number of angles relative to the surface of the object and the set of sensor panels generates sensor data in response to detecting backscatter received through the opening, wherein the backscatter is formed in response to the x-ray beam encountering the object. The controller operates to control the mobility system to move portable housing on the surface of the object, wherein the opening in the portable housing follows a joining feature on the object as the portable housing moves on the surface of the object; control the x-ray system to direct the x-ray beam to scan an area of the object containing the joining feature as the portable housing moves on the surface of the object with the opening following the joining feature on the object; move the set of sensor panels to a selected angle in the number of angles relative to the surface of the object to increase a detection of the backscatter through the opening; and receive the sensor data generated from the backscatter detected by the set of sensor panels, wherein the backscatter is for the area of the object scanned, wherein the area includes the joining feature.

Another embodiment of the present disclosure provides a radiation scanning system comprising a portable housing having a chamber, a mobility system connected to the portable housing, a radiation system located within the chamber of the portable housing, a sensor system located within the chamber of the portable housing, and a controller. The radiation system is configured to emit a radiation beam through an opening in the portable housing. The sensor system is configured to generate sensor data responsive to detecting backscatter received through the opening, wherein the backscatter is formed in response to the radiation beam encountering a joining feature on an object. The controller operates to control the mobility system to move the portable housing on a surface of the object, wherein the opening in the portable housing follows the joining feature on the object as the portable housing moves on the surface of the object; control the radiation system to direct the radiation beam through the opening to scan an area of the object containing the joining feature as the portable housing moves on the surface of the object with the opening following the joining feature on the object; control a positioning of the sensor system within the chamber that increases the backscatter detected by the sensor system through the opening; and receive the sensor data generated from the backscatter detected by the sensor system.

Yet another embodiment of the present disclosure provides a method for inspecting a joining feature on an object. A portable housing with an x-ray system is moved along the joining feature on the object. The x-ray system is controlled to direct an x-ray beam through an opening in the portable housing to scan an area of the object containing the joining feature as the portable housing moves along the joining feature on the object. Sensor data generated from a backscatter detected by a sensor system is received. The backscatter is generated in response to the x-ray beam encountering the area of the object including the joining feature. A determination is made as to whether an inconsistency is present in the area of the object including the joining feature using the sensor data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that x-ray wealth inspection involves axing both sides of the weld at the joint. Illustrative embodiments recognize and take into account that this access can be complicated and difficult for large structures such as aircraft or ships. The illustrative embodiments also recognize and take into account that ultrasonic wealth inspection can be performed from one side of the structure in many cases. The illustrative embodiments recognize and take account, however, that this type of inspection requires complicated beam steering. Further, the illustrative embodiments recognize and take into account ultrasonic wealth inspection can be limited when the weld bead is large, uneven, or not pre-machined.

The illustrative embodiments recognize and take into account that eddy current inspection techniques use a machined surface and are subject to sensitivity to local geometry, often masking the flaws one is trying to detect. The illustrative embodiments recognize and take into account that infrared thermography can perform inspections quickly, but is limited to joints that are not highly conductive (non-metal) and have joint depth limitations.

Thus, the illustrative embodiments provide a method, apparatus, system, and computer program product for inspecting joining features such as welds, joints, bonds, and other features in a location where two or more components are joined to each other. A portable housing with an x-ray system is moved along the joining feature on the object. The x-ray system is controlled to direct an x-ray beam through an opening in the portable housing to scan an area of the object containing the joining feature as the portable housing moves along the joining feature on the object. Sensor data generated from a backscatter detected by a sensor system is received. The backscatter is generated in response to the x-ray beam encountering the area of the object including the joining feature. A determination is made as to whether an inconsistency is present in the area of the object including the joining feature using the sensor data.

Figure 1:
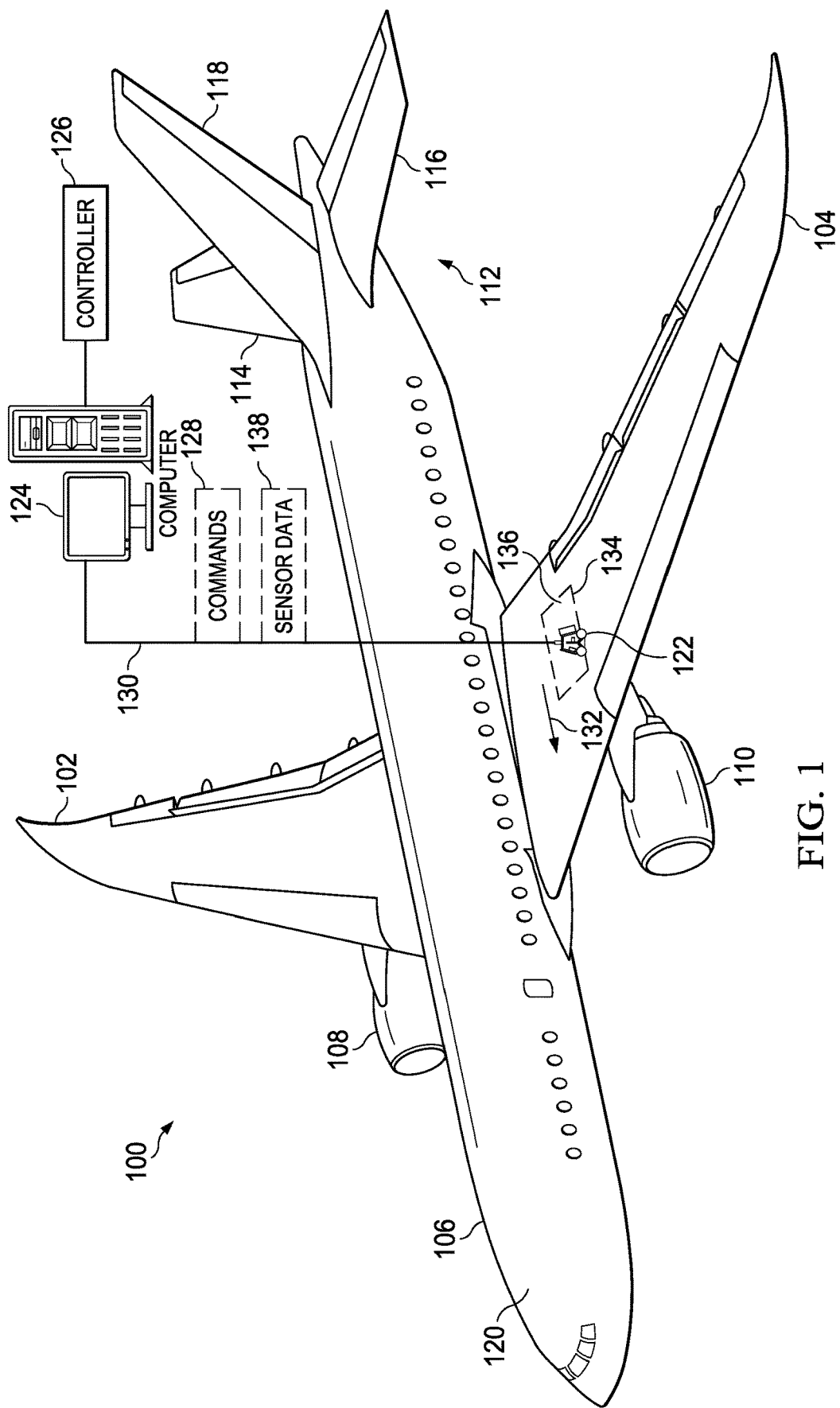
FIG. 1 is an illustration of an inspection of an aircraft in accordance with an illustrative embodiment.

With reference now to the figures, and in particular, with reference to FIG. 1, an illustration of an inspection of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

In this illustrative example, welds on exterior surface 120 of aircraft 100 can be inspected using a radiation scanning system. In this illustrative example, the radiation scanning system is a backscatter x-ray detection system that is comprised of mobile inspection unit 122 and computer 124 in inspection environment 101.

Mobile inspection unit 122 is a hardware apparatus that can move on exterior surface of aircraft 100 to inspect welds. These welds can be for skin panels on body 106, wing 102, wing 104, and other areas can be inspected using mobile inspection unit 122.

The operation of mobile inspection unit 122 can be controlled by controller 126 located in computer 124. Controller 126 can be software, hardware, or both in computer 124. As hardware, controller 126 can be a computer program comprised of program code configured to run on hardware, such as a processor unit in computer 124. As hardware, controller 126 can be an application specific integrated circuit (ASIC) or logic gates that designed to perform operations to control the operation of mobile inspection unit 122.

Controller 126 can control mobile inspection unit 122 by sending commands 128 over communications link 130. Communications link 130 can be a physical connection or a wireless connection. When communications link 130 is a physical connection, communications link 130 can be an ethernet cable, a physical wire, a fiber optic cable, or other physical connector. When communications link 130 is a wireless connection, communications link 130 can be implemented using a number of different wireless technologies. For example, communications link 130 can be established using Wi-Fi signals, Bluetooth signals, infrared signals, cellular signals, or other suitable types of signals.

As used herein, a "number of" when used with reference to items means one or more items. For example, a number of different wireless technologies is one or more different wireless technologies.

As depicted, controller 126 controls mobile inspection unit 122 to move in the direction of arrow 132 along weld 134 for skin panel 136 on wing 104 to inspect weld 134. In this illustrative example, mobile inspection unit 122 generates sensor data 138 as mobile inspection unit 122 travels along weld 134 and scans weld 134.

In this illustrative example, sensor data 138 can take a number of different forms. For example, sensor data 138 can comprise pixels that indicate intensities of a backscatter detected by mobile inspection unit 122 while mobile inspection unit 122 scans weld 134. The pixels can be grouped to form images in sensor data 138.

In this illustrative example, skin panel 136 is one of many skin panels that are present but not shown on bod, 106, wing, 102, and wing 104. These other skin panels can have different shapes from skin panel 136.

Figure 2:
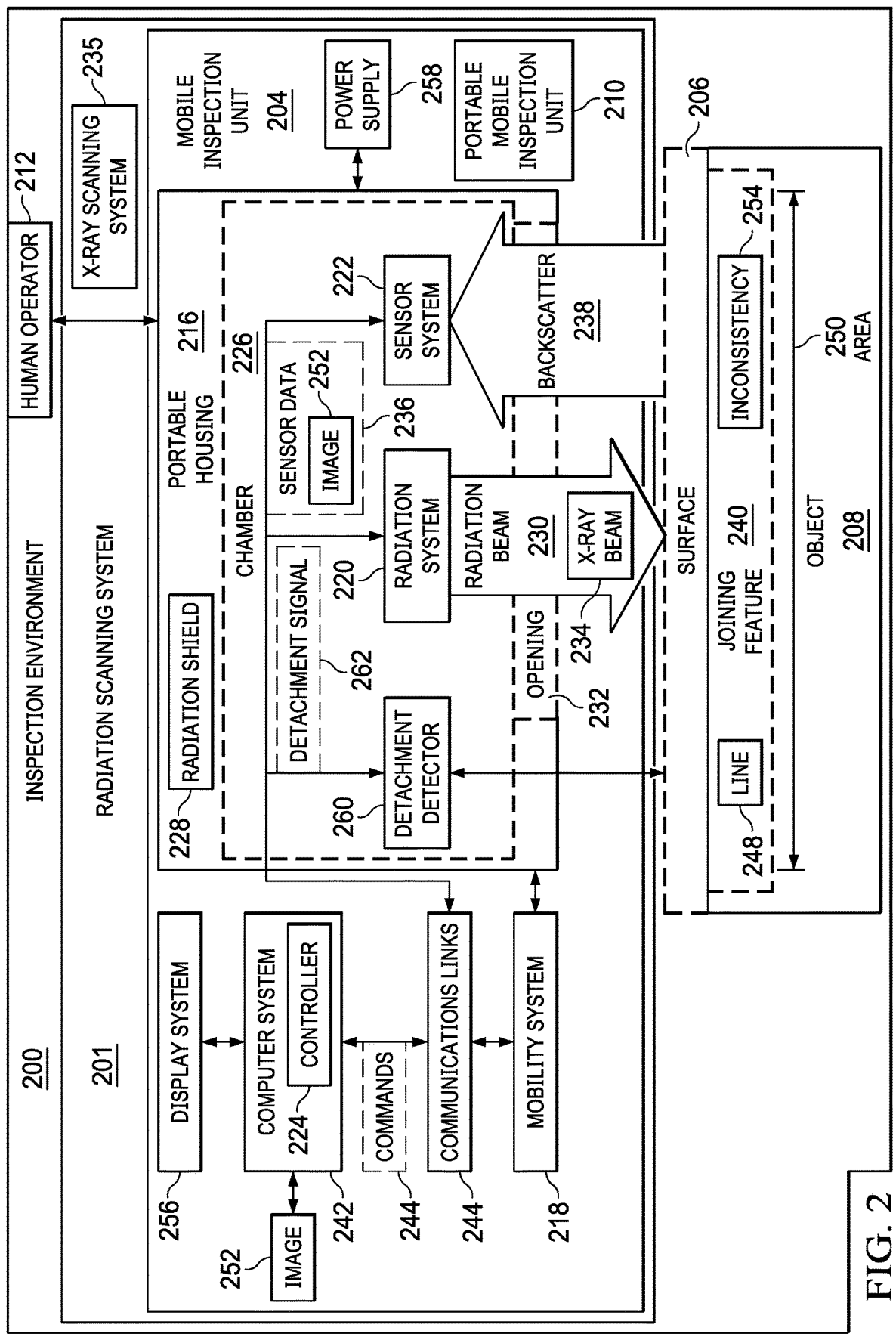
FIG. 2 is an illustration of a block diagram of an inspection environment in accordance with an illustrative embodiment.

With reference now to FIG. 2, an illustration of a block diagram of an inspection environment is depicted in accordance with an illustrative embodiment. Inspection environment 101 in FIG. 1 is an example of an implementation for the different blocks shown for inspection environment 200 in this figure.

As depicted, in this illustrative example, radiation scanning system 201 comprises mobile inspection unit 204, which can move on surface 206 of object 208 as depicted, object 208 can take a number of different forms. For example, object 208 can be one of a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, a fuselage, a wing, a pipeline, a gas pipeline, an oil pipeline, and other suitable types of objects for which inspections may be desired.

In this illustrative example, mobile inspection unit 204 can be portable mobile inspection unit 210. When mobile inspection unit 204 takes the form of portable mobile inspection unit 210, mobile inspection unit 204 can be carried or moved by human operator 212.

As depicted, mobile inspection unit 204 can move along surface 206 of object 208 scanning object 208 to inspect object 208. For example, mobile inspection unit 204 scans object 208 while moving along surface 206 of object 208. This inspection can be performed during at least one of the manufacturing of object 208, use of object 208, or maintenance for object 208.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, mobile inspection unit 204 comprises a number of different components. As depicted, mobile inspection unit 204 comprises portable housing 216, mobility system 218, radiation system 220, sensor system 222, and controller 224.

In this illustrative example, portable housing 216 is a platform or frame for carrying the different components in mobile inspection unit 204. In this illustrative example, human operator 212 can perform at least one of positioning or moving portable housing 216 on surface 206 of object 208.

As depicted, portable housing 216 has chamber 226 and radiation shield 228. In this illustrative example, chamber 226 is a cavity for space within portable housing 216 which different components of mobile inspection unit 204 can be located.

Radiation shield 228 for portable housing 216 comprises at least one of a lead wall, a lead-polyethylene-boron composite wall, a lead liner, a lead-polyethylene-boron composite liner, or other suitable materials capable reducing the passing of radiation through portable housing 216. With this design, the reduction radiation does not occur through opening 232.

In one illustrative example, radiation shield 228 can be configured to reduce radiation to a selected level to enable desired operation of mobile inspection unit 204. By designing radiation shield 228 to reduce or prevent the escape of radiation from chamber 226 through portable housing 216, human operator 212 can be within some selected distance of mobile inspection unit 204 while avoiding undesired exposure to radiation.

As depicted, mobility system 218 is connected to portable housing 216. In the illustrative examples, when one component is "connected" to another component, the connection is a physical connection. For example, a first component, mobility system 218, can be considered to be physically connected to a second component, portable housing 216, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

In this illustrative example, mobility system 218 can be located on the exterior of portable housing 216, within chamber 226, or a combination thereof. In this illustrative example, mobility system 218 can also operate to attach portable housing 216 to surface 206 of object 208 in addition to moving portable housing 216.

As depicted, radiation system 220 is located within chamber 226 of portable housing 216. Further, radiation system 220 can be connected to portable housing 216 within chamber 226. Radiation system 220 can be configured to emit radiation beam 230 through opening 232 in portable housing 216. Radiation beam 230 can be an x-ray beam 234. In this example, radiation scanning system can be x-ray scanning system 235. In other illustrative examples, radiation beam 230 can be comprised of other types of radiation instead of x-rays. For example, the radiation in radiation beam 230 can also be, for example, gamma rays or other radiation capable of penetrating surface 206 of object 208.

In this illustrative example, sensor system 222 can be located within chamber 226 of portable housing 216 and connected to chamber 226. As depicted, sensor system 222 can generate sensor data 236 in response to detecting backscatter 238 formed in response to radiation beam 230 encountering joining feature 240 on object 208. Joining feature 240 can take a number of different forms. For example, joining feature 240 can be selected from at least one of a joint, a weld, a bond line, or other features resulting from the joining of two components to each other. For example, joining feature 240 of interest can be a weld, a joint, the joint and the weld formed at the joint, or other characteristic resulting from of joining two or more components in object 208 to each other. In other words, the inspection feature of interest can be the joint, the weld formed at the joint. In another example, the inspection feature of interest can be a bond line, which can be the material that contacts components that are joined to each other.

In this illustrative example, controller 224 controls the operation of mobile inspection unit 204. Controller 224 is hardware and can include software, firmware, or a combination thereof. When software is used, the operations performed by controller 224 can be implemented in program code configured to run on hardware, such as a processor unit. When firmware is used, the operations performed by controller 224 can be implemented in program code and data and stored in persistent memory to run on a processor unit. When hardware is employed, the hardware can include circuits that operate to perform the operations in controller.

In the illustrative examples, the hardware for controller 224 can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

For example, controller 224 can be computer system 242. Computer system 242 is a physical hardware system and includes one or more data processing systems. When more than one data processing system is present in computer system 242, those data processing systems are in communication with each other using a communications medium. The communications medium can be a network. The data processing systems can be selected from at least one of a computer, a server computer, a tablet computer, or some other suitable data processing system.

Controller 224 can be located on portable housing 216, within chamber 226, or a remote location to portable housing 216. In illustrative example, controller 224 can control the operation of components such as mobility system 218, radiation system 220, and sensor system 222 by sending commands 244 over a number of communications links 246. The number of communications links 246 can be selected from at least one of a physical communications link or a wireless communications link. With a physical communications link can be an ethernet cable, a physical wire, a fiber optic cable, and other types of physical communications links. A wireless communications link can be one of using Wi-Fi signals, Bluetooth signals, infrared signals, cellular signals, and other suitable types of wireless signals.

As depicted, controller 224 can operate to control mobility system 218 to move portable housing 216 on surface 206 of the object 208. This movement can be such that opening 232 in portable housing 216 follows joining feature 240 on object 208 as portable housing 216 moves on surface 206 of object 208. For example, joining feature 240 can have a shape similar to line 248, which is followed by the operation of mobility system 218 as controlled by controller 224. Line 248 can be a straight line, a curve, an irregular line, or some other type of line where a joint is present for joining feature 240. In this illustrative example, controller 224 can implement an algorithm such as a line following algorithm used in robots to control mobility system 218 such that opening 232 in portable housing 216 follows joining feature 240.

Controller 224 can also operate to control radiation system 220 to direct radiation beam 230 through opening 232 to scan area 250 of object 208 containing joining feature 240 as portable housing 216 moves on surface 206 of object 208 with opening 232 following joining feature 240 on object 208. In one illustrative example, controller 224 can control x-ray beam 234 to scan surface 206 of object 208 through opening 232.

In illustrative example, controller 224 can control a positioning of sensor system 222 within chamber 226 in a manner that increases backscatter 238 detected by sensor system 222 through opening 232. Controller 224 can receive sensor data 236 generated from backscatter 238 detected by sensor system 222.

In this illustrative example, sensor data 236 include image 252 or information that can be used to generate image 252. For example, sensor data 236 can comprise pixels that indicate intensities of backscatter 238 detected by sensor system 222 while radiation system 220 scans area including joining feature 240. The pixels can be grouped to form image 252 from sensor data 236.

In this example, controller 224 can generate image 252 of object 208 including joining feature 240 from sensor data 236. Controller 224 can analyze image 252 to determine whether inconsistency 254 is present in object 208. For example, controller 224 can analyze image 252 to determine whether inconsistency 254 is present in area 250 of object 208. Inconsistency 254 can be in at least one of joining feature 240 or other parts of object 208 in area 250.

Additionally, controller 224 can display image 252 on display system 256. Display system 256 is a physical hardware system and includes one or more display devices on which a graphical user interface can be displayed. The display devices can include at least one of a light emitting diode (LED) display, a liquid crystal display (LCD), an organic light emitting diode (OLED) display, a computer monitor, a projector, a flat panel display, a heads-up display (HUD, or some other suitable device that can output information for the visual presentation of information.

Inconsistency 254 can take a number of different forms. Inconsistency 254 can be in at least one of a void, a delamination, a crack, porosity in a weld, an under-fill, a lack of fusion in a weld, or some other undesired condition in joining feature 240 or in area 250 around joining feature 240.

This illustrative example, sensor data 236 can include image 252 or information that can be used to generate image 252. For example, sensor data 236 can comprise pixels that indicate intensities of backscatter 238 detected by sensor system 222 while radiation system 220 scans area 250 including joining feature 240. The pixels can be grouped to form image 252 from sensor data 236.

In this illustrative example, mobile inspection unit 204 also includes power supply 258. As depicted, power supply 258 can provide power to operate at least one of mobility system 218, radiation system 220, sensor system 222, and controller 224. Power supply 258 can be, for example, a battery pack.

Further, mobile inspection unit 204 can also comprise detachment detector 260. In this illustrative example, detachment detector 260 is configured to determine whether portable housing 216 is on surface 206 of object 208. With detachment detector 260, controller 224 halts emission of radiation beam 230 in response to a determination that portable housing 216 is detached from surface 206 of object 208. In this illustrative example, the determination that portable housing 216 has detached from surface 206 can be made using detachment signal 262 received from detachment detector 260.

Detachment detector 260 take a number of different forms. For example, detachment detector 260 can comprises at least one of a vacuum system, a proximity sensor, a camera, an ultrasonic sensor, or some other suitable type of detection system.

In one illustrative example, the vacuum system in detachment detector 260 can draw a vacuum within chamber 226 of portable housing 216 and a sensor in detachment detector 260 can detect a level of vacuum within chamber 226 of portable housing 216. In this illustrative example, the sensor can indicate when the level of a vacuum is lower than a threshold for when portable housing 216 is on surface 206 of object 208 by generating detachment signal 262.

In another illustrative example, a proximity sensor in detachment detector 260 can be attached to a wheel in the mobility system 218 to indicate whether portable housing 216 is on surface 206 of object 208. When the proximity sensor detects that the wheel is no longer on surface 206, the proximity sensor can generate detachment signal to 262.

In yet another illustrative example, detachment detector 260 can include a camera in which images can be generated to determine whether portable housing 216 is on surface 206. Images can show portable housing 216 relative to surface 206 on object 208. In yet another illustrative example, an ultrasonic sensor system can determine whether portable housing has moved away from surface 206 of object 208. In this example, the camera can be in a location external to portable housing 216.

Figure 3:
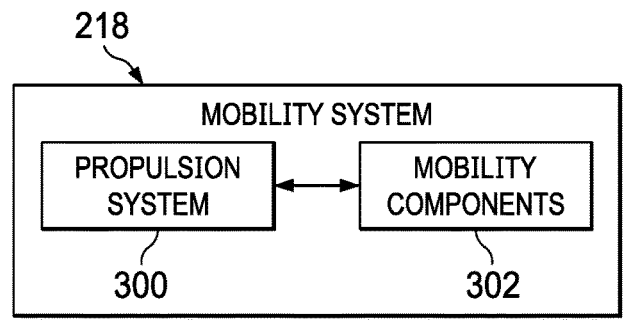
FIG. 3 is an illustration of a block diagram of a mobility system for portable mobile inspection unit in accordance with an illustrative embodiment.

Turning next to FIG. 3, an illustration of a block diagram of a mobility system for portable mobile inspection unit is depicted in accordance with an illustrative embodiment. In the illustrative examples, the same reference numeral may be used in more than one figure. This reuse of a reference numeral in different figures represents the same element in the different figures.

In this illustrative example, one implementation for mobility system 218 in portable mobile inspection unit 210 in FIG. 2 is shown. As depicted, mobility system 218 comprises a propulsion system 300 and mobility components 302.

In this illustrative example, propulsion system 300 can provide power to operate mobility components 302. Propulsion system 300 can be, for example, selected from at least one of an internal combustion engine, an electric engine, an electric motor, or some other suitable mechanism that is capable of moving portable housing 216 in FIG. 2.

As depicted, mobility components 302 provide portable housing 216 with the capability to move in a number of directions. Mobility components 302 can be selected to enable movement of portable housing 216 in a manner such that opening 232 in FIG. 2 portable housing 216 can follow joining feature 240 in FIG. 2.

In other words, mobility components 302 can include a steering mechanism that enables changing the direction of movement of portable housing 216. In illustrative example, mobility components 302 can be selected from at least one of at least one of a wheel, a roller, a holonomic wheel, a magnetic roller, a vacuum roller, a magnetic wheel, a vacuum wheel, a magnetic holonomic wheel, a track, a vacuum holonomic wheel, a magnetic track, or other suitable components. As used herein, a holonomic wheel or an omni wheel is a wheel that is capable of moving in multiple directions across a surface.

When mobility components 302 also operate to attach mobility system 218 for portable housing 216 to surface 206 of object 208 in FIG. 2, mobility components 302 can be, for example, magnetic or more vacuum mobility components.

The components illustrated for mobility system 218 in this figure is an example of one implementation for mobility system 218 and not meant to limit the manner in which other illustrative examples can be implemented. In another illustrative example, propulsion system 300 can be a robotic arm that holds and moves portable housing 216 on surface 206 of object 208. In yet another illustrative example, propulsion system 300 can be human operator 212 in FIG. 2. In this particular example, human operator 212 can move portable housing 216 to follow joining feature 240 in FIG. 2 using mobility components 302 in mobility system 218.

Figure 4:
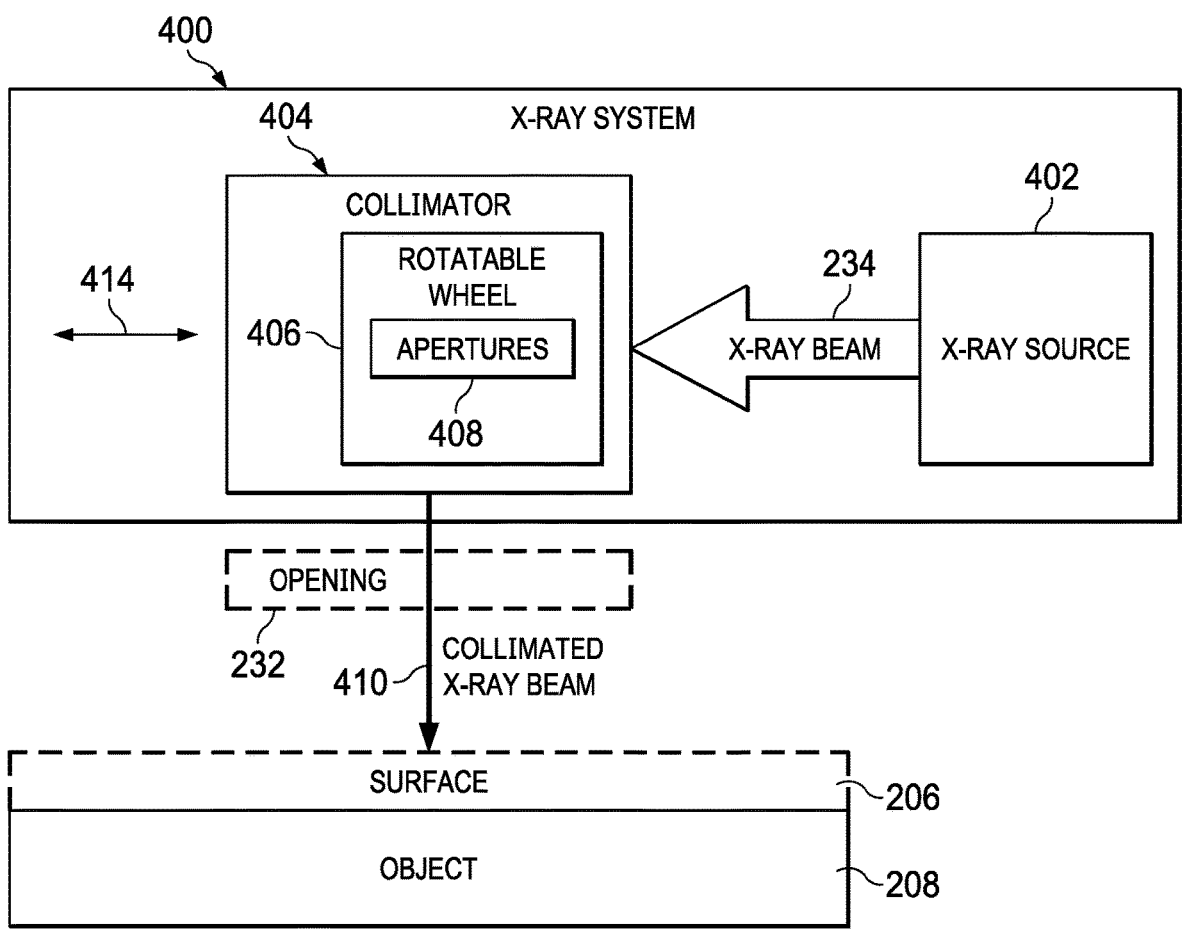
FIG. 4 is illustration of a block diagram of radiation system for a portable mobile inspection unit in accordance with an illustrative embodiment.

Turning now to FIG. 4, illustration of a block diagram of radiation system for a portable mobile inspection unit is depicted in accordance with an illustrative embodiment. In this illustrative example, radiation system 220 for portable mobile inspection unit 210 in FIG. 2 takes the form of x-ray system 400.

In this illustrative example, x-ray system 400 includes a number of different components. As depicted, x-rays system 400 comprises x-ray source 402 and collimator 404.

In this example, x-ray source 402 is a source of x-rays that are emitted from x-ray system 400 as x-ray beam 234 in FIG. 2. X-ray source 402 can be, for example, an x-ray tube.

As depicted, collimator 404 is a device which can shape and direct x-ray beam 234. For example, collimator 404 can narrow x-ray beam 234. Collimator 404 can operate to cause x-ray beam 234 to have a fan shape and to move in a scanning fashion along an axis.

In one illustrative example, collimator 404 can comprise rotatable wheel 406 having a number of apertures 408. The number of apertures 408 can allow at least a portion of x-ray beam 234 to pass through rotatable wheel 406.

For example, rotatable wheel 406 is configured to rotate while the x-ray source 402 generates x-ray beam 234 such that the number of apertures 408 allows a portion of x-ray beam 234 to pass through rotatable wheel 406. The portion of x-ray beam 234 passes through an aperture in the number of apertures 408 as collimated x-ray beam 410 that travels through the opening 232 in portable housing 216 in FIG. 2 towards surface 206 of object 208. In one illustrative example, collimated x-ray beam 410 can have a fan shape when the number of apertures 408 are the form of slits.

Further, movement of rotatable wheel 406 moves apertures 408, which can cause collimated x-ray beam 410 with a fan shape to move in a manner that scans an area.

In this example, mobility system 218 in FIG. 2 can move portable housing 216 while rotatable wheel 406 rotates and while x-ray beam 234 is emitted through opening 232 in portable housing 216 towards surface 206 of object 208. Further, rotatable wheel 406 can be configured to rotate about axis 414 in which portable housing 216 moves in a direction along axis 414 such that a number of images is generated by the sensor system 222 using backscatter 238 in FIG. 2 detected in response to at least a portion of the x-ray beam 234 encountering object 208.

The illustration of x-rays system 400 is not meant to limit the manner in radiation system 220 can be implemented. In another illustrative example, collimator 404 may have a single aperture connected to x-ray source 402 in which x-ray source 402 can rotate to cause x-ray beam 234 to scan the area. In yet another illustrative example, apertures 408 can cause x-ray beam 234 to have a different shape other than a fan shape. For example, x-ray beam 234 can have a circular or oval shape depending on the particular implementation.

Figure 5:
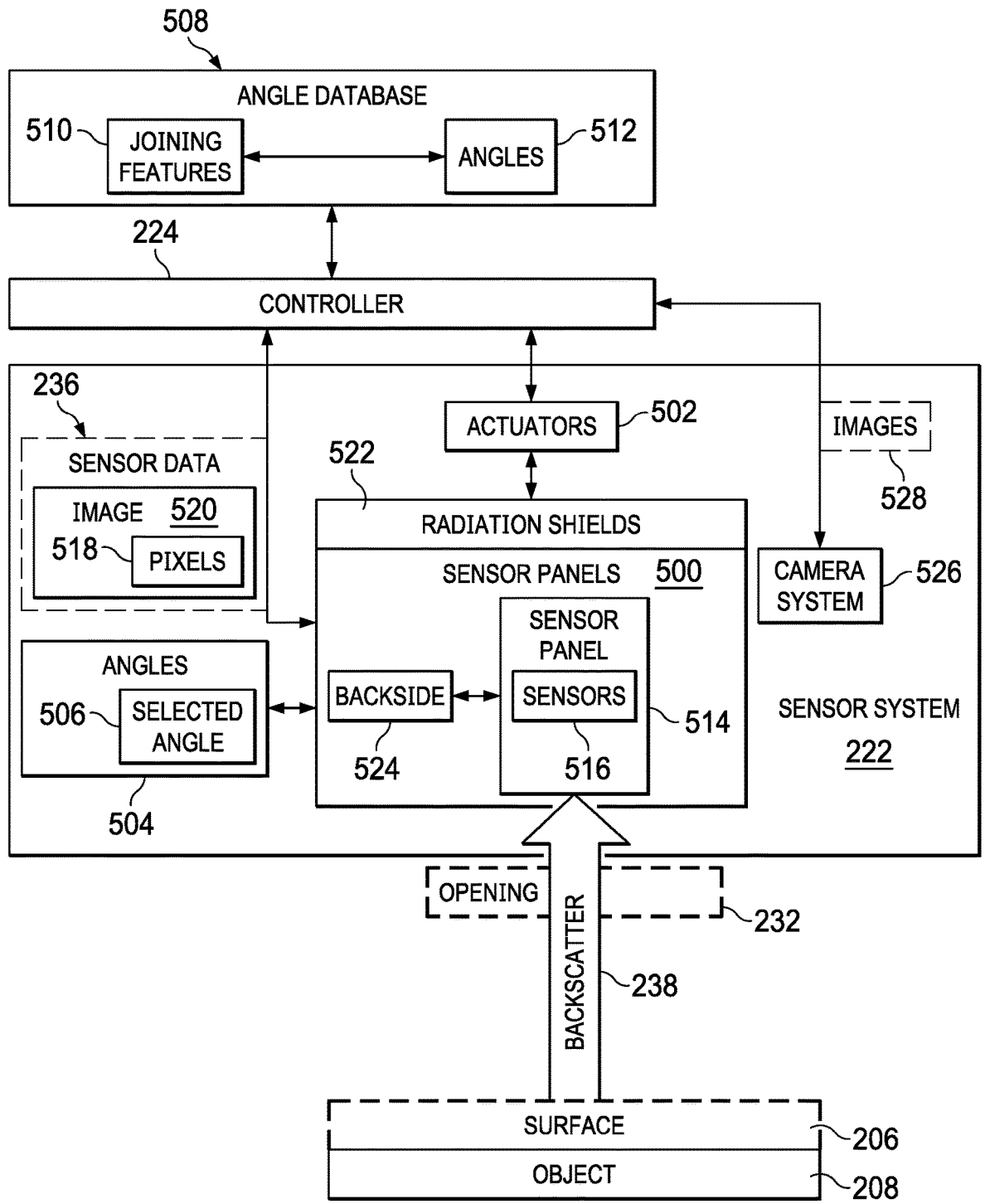
FIG. 5 is an illustration of a sensor system for a portable mobile inspection unit in accordance with an illustrative embodiment.

Turning to FIG. 5, an illustration of a sensor system for a portable mobile inspection unit is depicted in accordance with an illustrative embodiment. In this illustrative example, an illustration of an implementation for sensor system 222 for portable mobile inspection unit 210 in FIG. 2 is shown.

As depicted, sensor system 222 can have a number of different components. As depicted, sensor system 222 can comprise a set of sensor panels 500 and a number of actuators 502. As used herein, "a set of" when used with reference items means one or more items. For example, a set of sensor panels 500 is one or more of sensor panels 500.

The set of sensor panels 500 is movable to a number of angles 504 relative to surface 206 of object 208 in FIG. 2. The number of actuators 502 can move the set of sensor panels 500 to the number of angles 504 that increase the detection of backscatter 238 through opening 232 from area 250 in FIG. 2 of object 208 containing joining feature 240 in FIG. 2.

For example, controller 224 can control the set of actuators 502 to move the set of sensor panels 500 to selected angle 506 in the number of angles 504 to increase the detection of backscatter 238 through opening 232 in portable housing 216 in FIG. 2. The selected angle 506 can be an angle other than zero degrees or parallel to surface 206. The angle can be selected such that increased amount of backscatter 238 can be detected from backscatter 238 returning to joining feature 240. In other words, backscatter 238 from other locations can be reduced by the selection of selected angle 506.

The selection of selected angle 506 can be made any number of different ways. For example, controller 224 can identify selected angle 506 for joining feature 240 using angle database 508 that increases the detection of backscatter 238 for joining feature 240.

In this illustrative example, angle database 508 comprises joining features 510 correlated with angles 512 for increasing backscatter detection. In response to determining selected angle 506, controller 224 can control the number of actuators 502 to move the set of sensor panels 500 to selected angle 506 in number of angles 504 relative surface 206. As result, the detection of backscatter 238 through opening 232 from area 250 for object 208 containing joining feature 240 is increased In this illustrative example, the set of sensor panels 500 generates sensor data 236 in response to detecting backscatter 238. Sensor panel 514 in the set of sensor panels 500 can comprise sensors 516 corresponding to pixels 518. In this illustrative example, sensors 516 can be arranged in an array or matrix such that sensor data 236 from sensors 516 can form image 520 with pixels 518.

Sensors 516 can be implemented using a number of different types of sensors capable of detecting radiation, such as x-rays. For example, sensors 516 can be selected from at least one of a gas-filled detector, a simulation detector, a semiconductor detector, or other suitable type of device that can detect x-rays.

In this illustrative example, a number of radiation shields 522 can be located on backside 524 of the set of sensor panels 500. For example, a radiation shield in radiation shields 522 can be located on the side that is opposite to the side where backscatter 238 is detected by sensors in the set of sensor panels 500. The number of radiation shields 522 can reduce backscatter 238 traveling through the set of sensor panels 500.

In this illustrative example, sensor system 222 can also include sensor devices used for other purposes in addition to detecting backscatter 238. For example, sensor system 222 can include camera system 526 that generates images 528 of surface 206 of object 208 with joining feature 240. Controller 224 can steer mobility system 218 in FIG. 2 to move portable housing 216 to follow joining feature 240 using images 528 of surface 206 of object 208 with joining feature 240.

In one illustrative example, one or more technical solutions are present that overcome a technical problem with inspecting joining features such as welds at joints in objects such as an aircraft. Aa result, one or more technical solutions can provide a technical effect enabling inspection of complex structures such as aircraft or ships using a small lightweight inspection tool that can move along a structure to nondestructively inspect joining features using radiation such as x-rays and detecting backscatter from those x-rays. These joining features can be, for example, welds, a bond line, or other features at the joint where two or more components are joined to each other.

One or more illustrative examples provide a mobile inspection unit having a portable housing in which a radiation system is contained. The portable housing can have radiation shielding such that radiation from the portable housing is emitted through the opening in the portable housing that covers the joining feature of interest.

In one or more illustrative examples, the radiation beam such as an x-ray beam is scanned across the joining feature while the joining feature moves on the surface of the object following the joining feature. As depicted in the illustrative example, a mobility system can enable the mobile inspection unit to be a self-propelled crawler using mobility components such as wheels, tracks, or other components that can be operated to move the portable housing.

Further, sensor panels in the sensor system can be positioned at an angle rather than parallel to the surface to cover backscatter returning to the surface. An angle can be selected to increase the amount of backscatter detected. By increasing the amount of backscatter detected, increased detection efficiency of inconsistencies and improved contrast in images generated from sensor data can be achieved. Further, inspections can be made at a higher speed with this higher-quality data generated through the selection of the angle for the sensor panels.

The illustration of inspection environment 200 in the different components in FIGS. 2-5 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, radiation system 220 in FIG. 2 can emit one or more radiation beams in addition to radiation beam 230 when inspecting object 208. As another example, camera system 526 in sensor system 222 in FIG. 5 can be located outside of portable housing 216 while sensor panels 500 in sensor system 222 in FIG. 5 are located within portable housing 216.

Figure 6:
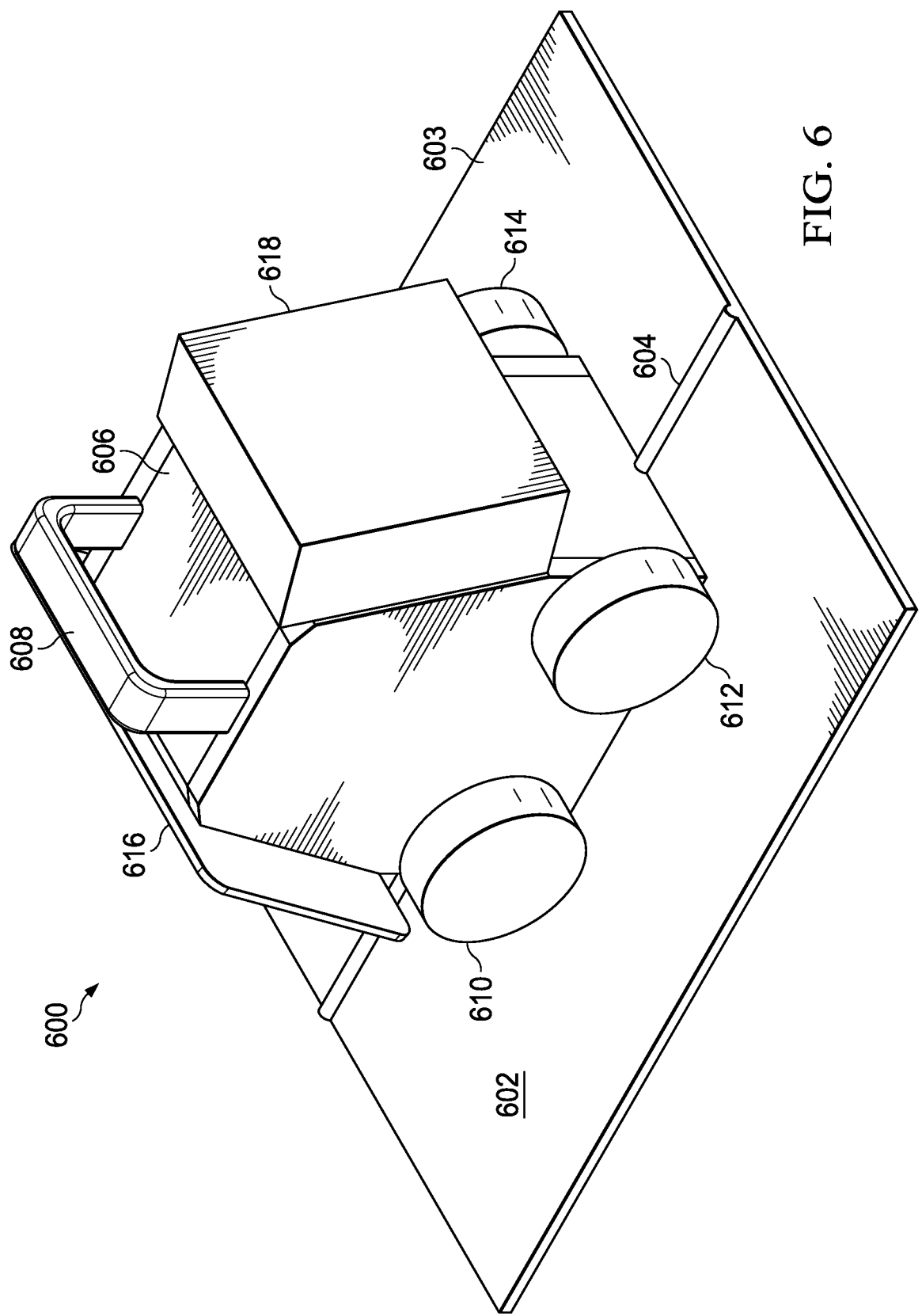
FIG. 6 is an illustration of a perspective view of a mobile inspection unit in accordance with an illustrative embodiment.

Turning now to FIGS. 6-9, a pictorial illustration of a mobile inspection unit is depicted in accordance with an illustrative embodiment. With reference first to FIG. 6, an illustration of a perspective view of a mobile inspection unit is depicted in accordance with an illustrative embodiment. Mobile inspection unit 600 is an example of one implementation for mobile inspection unit 204 shown in block form in FIG. 2. In this illustrative example, mobile inspection unit 600 shown on surface 602 of object 603 having weld 604'.

As depicted, mobile inspection unit 600 comprises portable housing 606. In this illustrative example, portable housing 606 provides a frame or platform for different components in mobile inspection unit 600. As depicted, portable housing 606 has handle 608, which can be used by human operator to move or carry mobile inspection unit 600. For example, human operator may use handle 608 to move mobile inspection unit 600 over a joining feature to inspect a joining feature.

As depicted, portable housing 606 is a shielded housing. In other words, portable housing 606 can have at least one of a set of layers, a set of coatings, or materials forming portable housing 606 that reduce the transmission of radiation that can pass through portable housing 606. As a result, components such as an x-ray source can operate within a change in portable housing 606 in a manner that reduces the transmission of x-rays through portable housing 606. In other words, portable housing 606 can provide shielding for human operator that may be in the vicinity or may be operating mobile inspection unit 600.

As seen in this view, magnetic wheel 610, magnetic wheel 612, and magnetic wheel 614 are mobility components for mobile inspection unit 600. These magnetic wheels enable mobile inspection unit 600 to be attached to the surface 602 of object 603 such as an oil pipeline or an aircraft fuselage. This attachment enables mobile inspection unit 600 to move on curved surfaces of the pipeline or the aircraft fuselage.

Also depicted in this view of mobile inspection unit 600 is tablet computer 616 and battery pack 618 are connected to portable housing 606. Tablet computer 616 is an example of an implementation for controller 224 and battery pack 618 is an example of power supply 258 shown in block form in FIG. 2.

Figure 7:
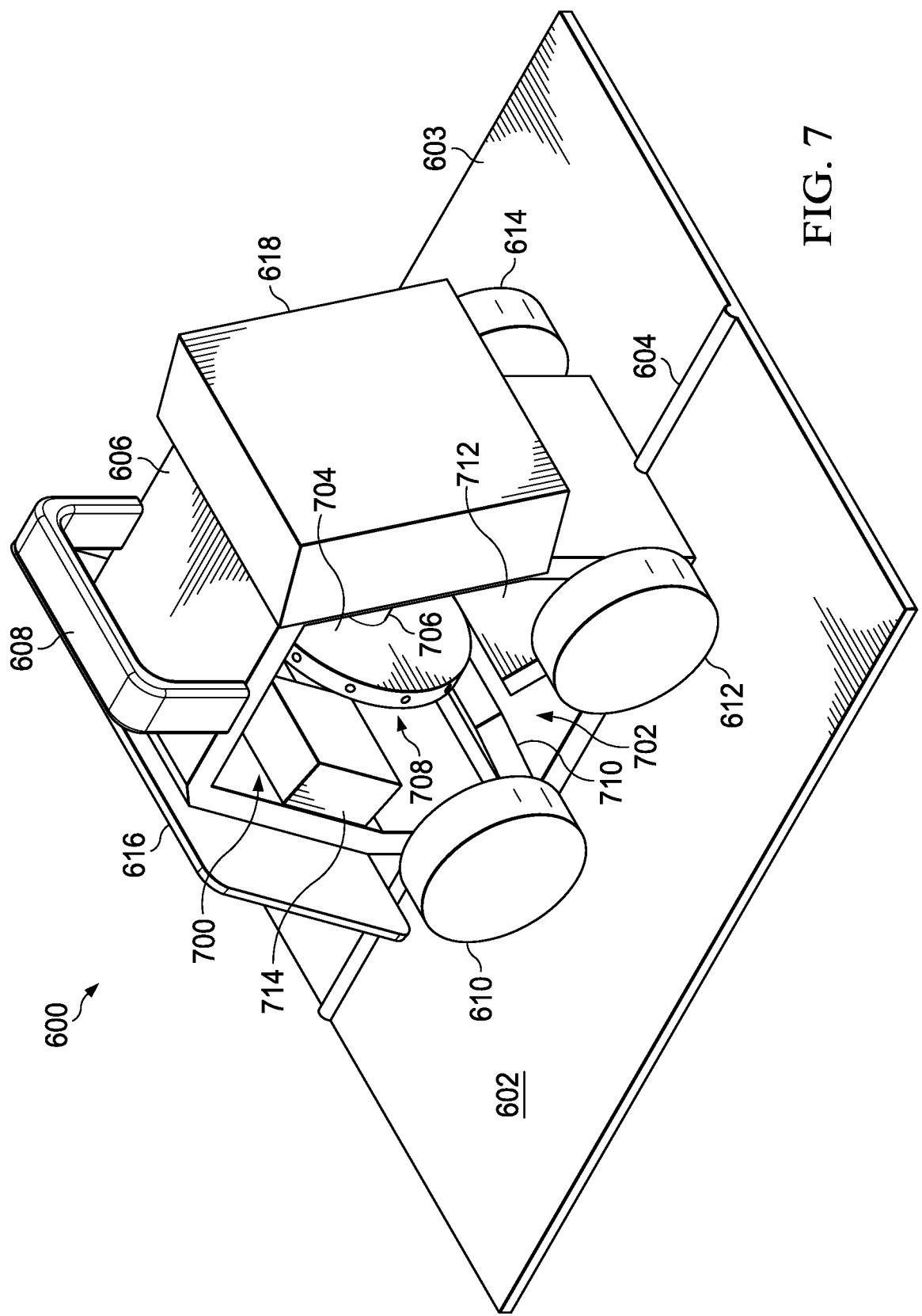
FIG. 7 is an illustration of an exposed perspective view of a mobile inspection unit in accordance with an illustrative embodiment.

Turning to FIG. 7, an illustration of an exposed perspective view of a mobile inspection unit is depicted in accordance with an illustrative embodiment. In this exposed view of mobile inspection unit 600, chamber 700 can be seen within portable housing 606 of mobile inspection unit 600. Also seen in this exposed view, is opening 702 in portable housing 606.

Rotatable wheel 704 and x-ray tube 706 can be seen in this exposed view. In this illustrative example, rotatable wheel 704 and x-ray tube 706 are examples of an implementation for radiation system 220 shown in block form in FIG. 2, rotatable wheel 704 is an example of an implementation for rotatable wheel 406 shown in block form in FIG. 4, and x-ray tube 706 is an example of an implementation for x-ray source 402 shown in block form in FIG. 4.

As depicted, rotatable wheel 704 has apertures 708. Apertures 708 are openings through which an x-ray beam from x-ray tube 706 can be emitted as a collimated x-ray beam.

Further, sensor panel 710 and sensor panel 712 are also seen within chamber 700 in this exposed view portable housing 606. In this illustrative example, the sensor panels are example of an implementation for sensor system 222 shown in block form in FIG. 2. Further, sensor panel 710 and sensor panel 712 are examples of an implementation for the set of sensor panels 500 shown in block form in FIG. 5.

As depicted, sensor panel 710 and sensor panel 712 can be positioned to a selected angle with respect to surface 602. This positioning can be provided through rotating the sensor panels. Sensor panel 710 and sensor panel 712 can be rotated to a selected angle to increase the amount of backscatter that can be detected by sensor panel 710 and sensor panel 712. The selected angle can be the same or different for sensor panel 710 and sensor panel 712.

Also depicted in this example is wireless transmitter 714. Wireless transmitter 714 can exchange radio frequency signals between components such as tablet computer 616, control components for operating or moving at least one of sensor panel 710, sensor panel 712, rotatable wheel 704 and x-ray tube 706. These control components can be, for example, actuators, switches, circuits. These control components can also have wireless transmitters or can be connected to wireless transmitter 714 physical connection such as wires or network cables.

As depicted, tablet computer 616 is an example one implementation for controller 224 in computer system 242 in FIG. 2. Tablet computer 616 can display images from sensor data received from sensor panel 710 and sensor panel 712 detecting backscatter resulting from an x-ray beam scanning weld 604. These images can be viewed by human operator moving or controlling mobile inspection unit 600.

Figure 8:
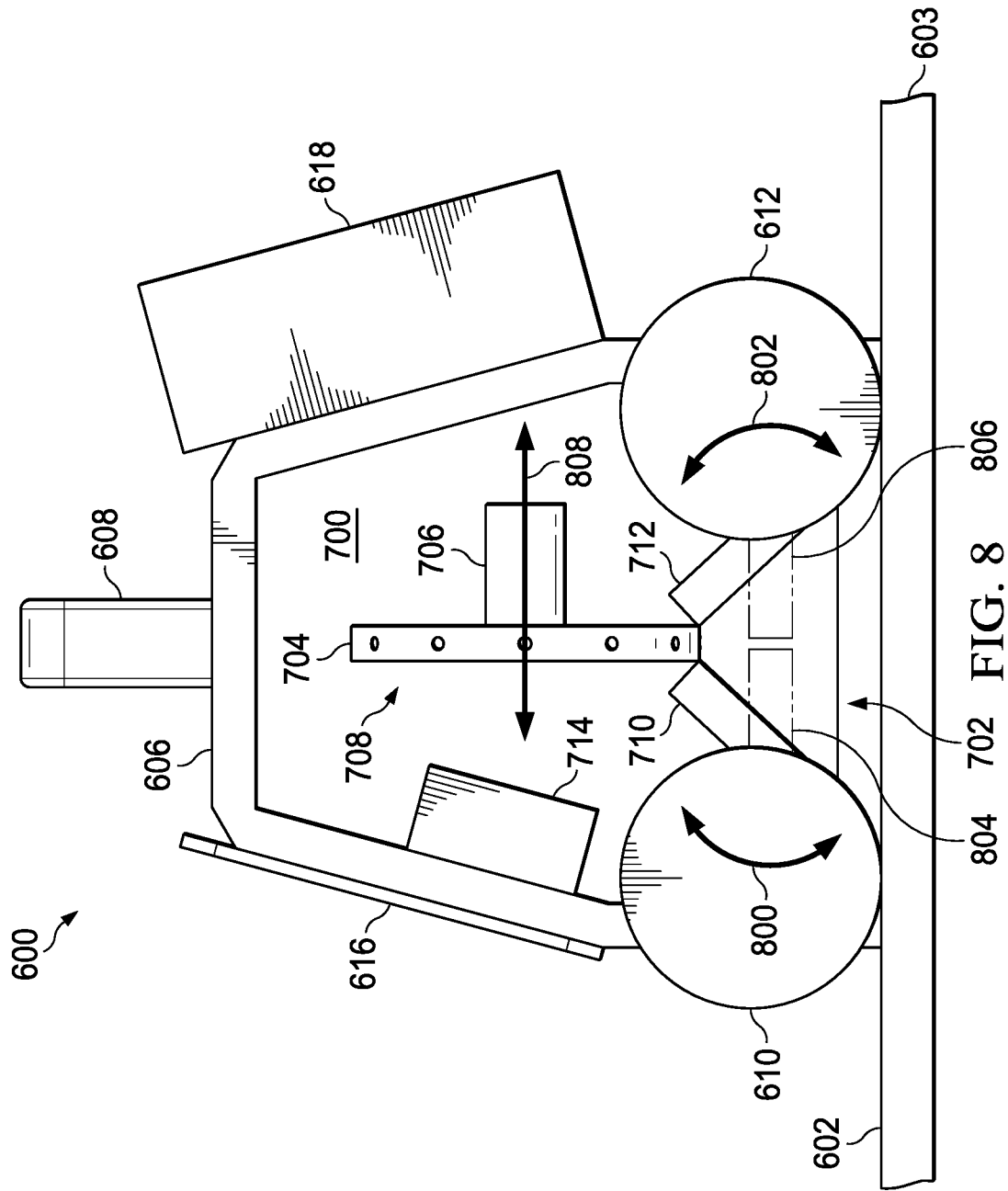
FIG. 8 is an illustration of a side exposed view of a mobile inspection unit in accordance with an illustrative embodiment.

With reference now to FIG. 8, an illustration of a side exposed view of a mobile inspection unit is depicted in accordance with an illustrative embodiment. In this exposed side, view mobile inspection unit 600, sensor panel 710 is rotatable in the direction of arrow 800. Sensor panel 712 is rotatably in the direction of arrow 802.

In this illustrative example, sensor panel 710 can be rotated in the direction of arrow 800. Sensor panel 712 can be rotated in the direction of arrow 802. These panels can be rotated using actuators (not shown) such as actuators 502 in FIG. 5. This rotation can be through a number of angles relative to surface 602. In one illustrative example, sensor panel 710 can be rotated to position 804 and sensor panel 712 can be rotated to position 806 be substantially parallel to surface 602.

As depicted in this example, rotatable wheel 704 can be rotated about axis 808 extending centrally through x-ray tube 706.

Figure 9:
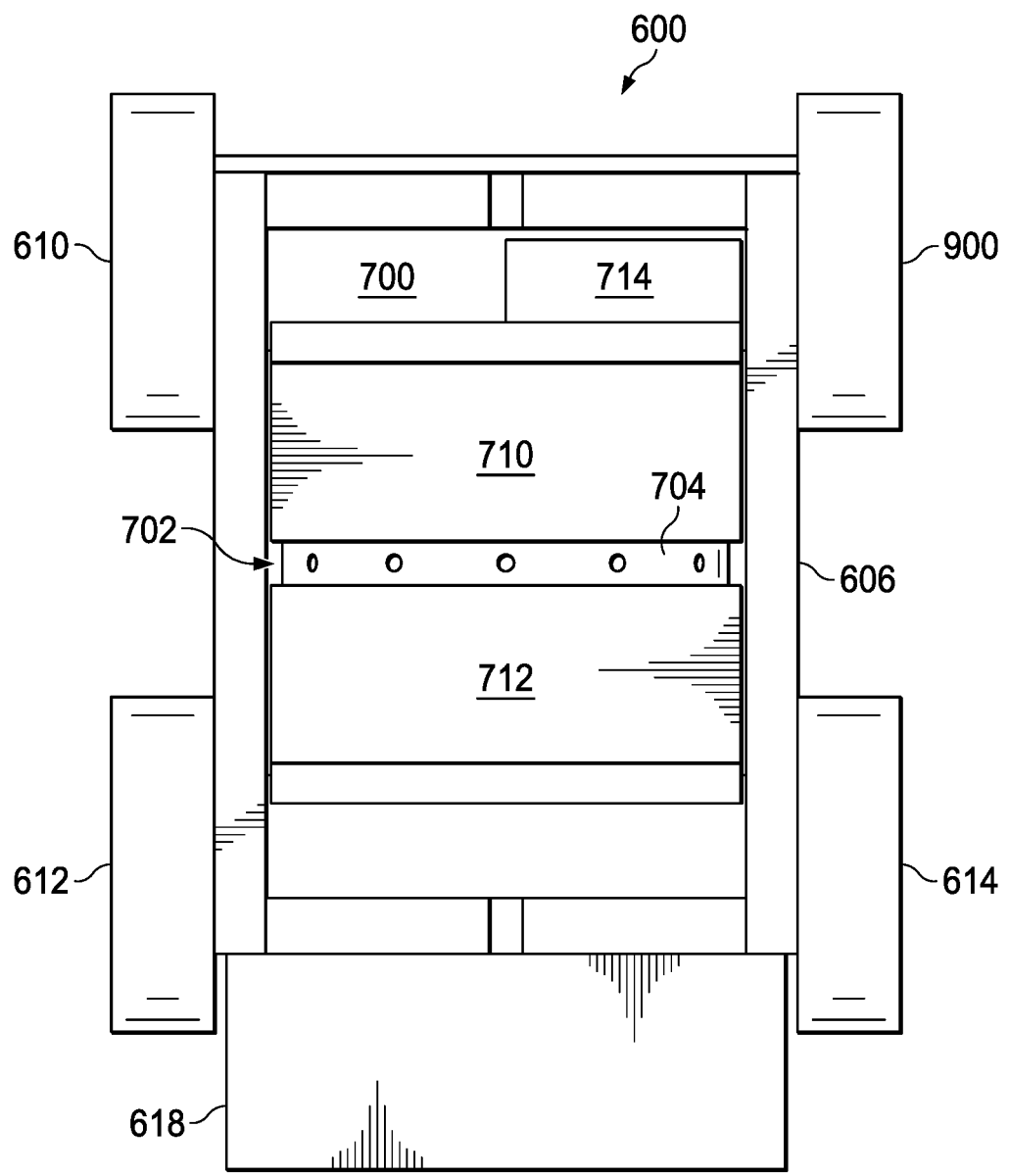
FIG. 9 is an illustration of a bottom view of a mobile inspection unit in accordance with an illustrative example.

Turning now to FIG. 9, an illustration of a bottom view of a mobile inspection unit is depicted in accordance with an illustrative example. In this figure, a view of mobile inspection unit 600 is seen from the bottom of mobile inspection unit 600. From this view, magnetic wheel 900 is shown.

In this view, sensor panel 710 and sensor panel 712 can be seen in chamber 700 through opening 702. Also visible through opening 702 is rotatable wheel 704. Further, magnetic wheel 900 can also be seen in this view of mobile inspection unit 600 in addition to magnetic wheel 610, magnetic wheel 612, and magnetic wheel 614.

Figure 10:
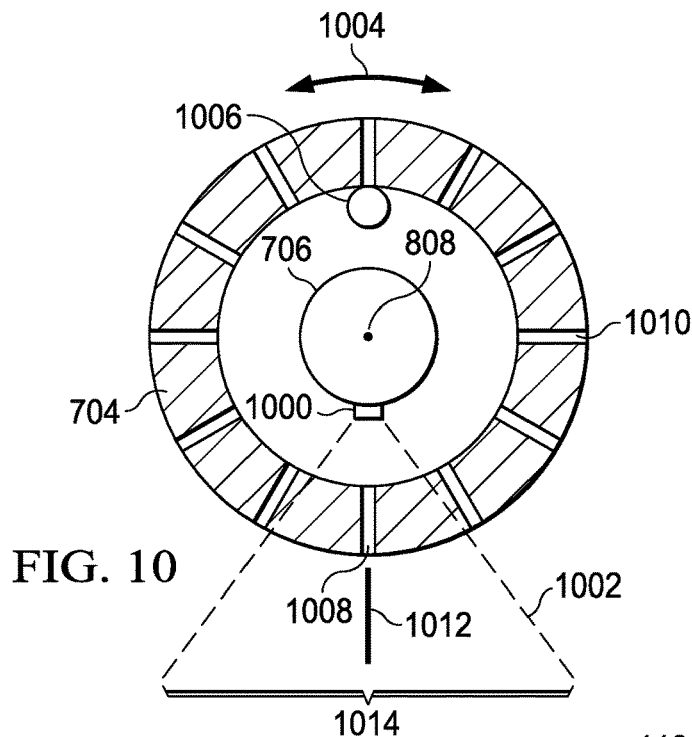
FIG. 10 is an illustration of an x-ray system in accordance with an illustrative embodiment.

With reference to FIG. 10, an illustration of an x-ray system is depicted in accordance with an illustrative embodiment. In operation, x-ray tube 706 generates x-rays that pass-through x-ray tube 706 at pass-through window 1000. The x-rays that pass-through window 1000 in x-ray tube 706 form x-ray beam 1002 in this illustrative example.

In this depicted example, rotatable wheel 704 can be rotated about axis 808 related in the direction of arrow 1004 by motor system 1006. Motor system 1006 can be an electric motor with a rotatable member that engages and moves rotatable wheel 704 in the direction of arrow 1004 about axis 808. Motor system 1006 or some other motor system can also rotate x-ray tube 706.

As depicted, rotatable wheel 704 is configured to rotate in the direction of arrow 1004. As rotatable wheel 704 rotates, apertures, such as aperture 1008 and aperture 1010, also rotate about axis 808. The apertures allow a portion of x-ray beam 1002 to pass through rotatable wheel 704.

In the illustrative example, a portion of x-ray beam 1002 passes through aperture 1008 in the form of collimated x-ray beam 1012. As rotatable wheel 704 rotates in the direction of arrow 1004, the portion of x-ray beam 1002 that forms collimated x-ray beam 1012 passing through aperture 1010 can change. With the movement of rotatable wheel 704 and the apertures, collimated x-ray beam 1012 can scan along line 1014, which is perpendicular to axis 808. In this manner, as portable housing 606 in FIG. 6 moves in the direction along axis 808, collimated x-ray beam 1012 can scan along line 1014 such that an area of the object can be scanned to inspect a joining feature within the area.

Figure 11:
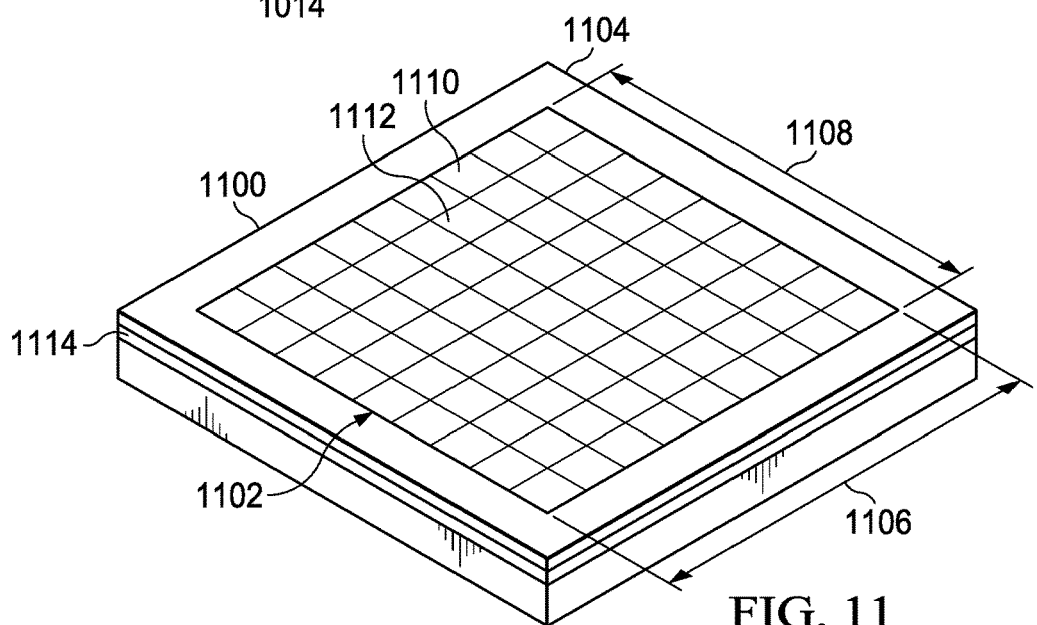
FIG. 11 is an illustration of a sensor panel in accordance with an illustrative embodiment.

With reference next to FIG. 11, an illustration of a sensor panel is depicted in accordance with an illustrative embodiment. In this illustrative example, sensor panel 1100 is an example of one implementation for sensor panel 514 shown in block form in in FIG. 5, sensor panel 710 and sensor panel 712 in FIG. 7.

As depicted, sensor panel 1100 comprises sensors 1102 in a frame 1104. Sensors 1102 are arranged in rows 1106 and columns 1108 to form an array or a matrix in frame 1104.

In this illustrative example, sensors 1102 correspond to pixels or images. For example, sensor 1110 generates a signal when detecting backscatter for a pixel. Sensor 1112 generates another signal when detecting backscatter for another pixel. As result, the signal generated by sensors 1102 can form pixels that form an image of the backscatter detected by sensor panel 1100. These signals can be sent to a controller or other device for analysis to determine whether inconsistency is present in a joining feature.

Further, sensor panel 1100 also includes radiation shield 1114. Radiation shield 1114 is a layer of material capable of reducing or preventing the radiation, such as x-rays. The material comprising radiation shield 1114 can be selected from at least one of lead, a lead-polyethylene-boron composite, or some other material capable of reducing the transmission of radiation through grade level for of sensor panel 1100. In this illustrative example, radiation shield 1114 is located on backside of sensors 1102 in sensor panel 1100.

As result, radiation can be detected by sensors 1102 while the transmission of radiation through sensor panel 1100 can be reduced.

The illustration of the different components for mobile inspection unit 600 in FIGS. 6-11 are provided for depicting some features of the illustrative examples and is not meant to limit the manner in which other illustrative examples can be implemented. Additionally, these illustrations are pictorial schematic illustrations and only components for features of the illustrative examples. Other components are not shown to avoid obscuring the illustration of these features. For example, a mount or connector for connecting x-ray tube 706 in FIG. 7 to portable housing 606 in FIG. 6 is not shown. As another example, connections between x-ray tube 706 and battery pack 618 in FIG. 6 are present but not shown in the different illustrative examples.

Figure 12:
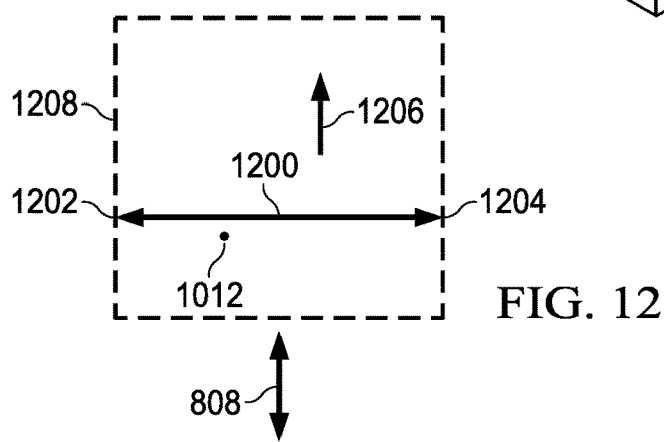
FIG. 12 is an illustration of scanning an area on the surface of an object in accordance with an illustrative embodiment.

Turning to FIG. 12, an illustration of scanning an area on the surface of an object is depicted in accordance with an illustrative embodiment. FIG. 12 is an illustration of scanning of collimated x-ray beam 1012 during movement of portable housing 606 in FIG. 6. As depicted, collimated x-ray beam 1012 can be scanned in the direction of arrow 1200 from side 1202 to side 1204. The detection of backscatter from each scan or sweep of collimated x-ray beam 1012 can form a row of pixels for an image. Arrow 1200 is perpendicular to axis 808 of x-ray tube 706 in FIG. 7.

As rotatable wheel 704 in FIG. 7 rotates, collimated x-ray beam 1012 can scan or sweep in the direction of arrow 1200 from side 1202 to side 1204. Further, the movement of portable housing 606 in the direction of arrow 1206 can be coordinated with the movement of rotatable wheel 704 to generate signals for rows pixels such that an image can be generated for area 1208 on surface 602 in FIG. 6 of an object.

Figure 13:
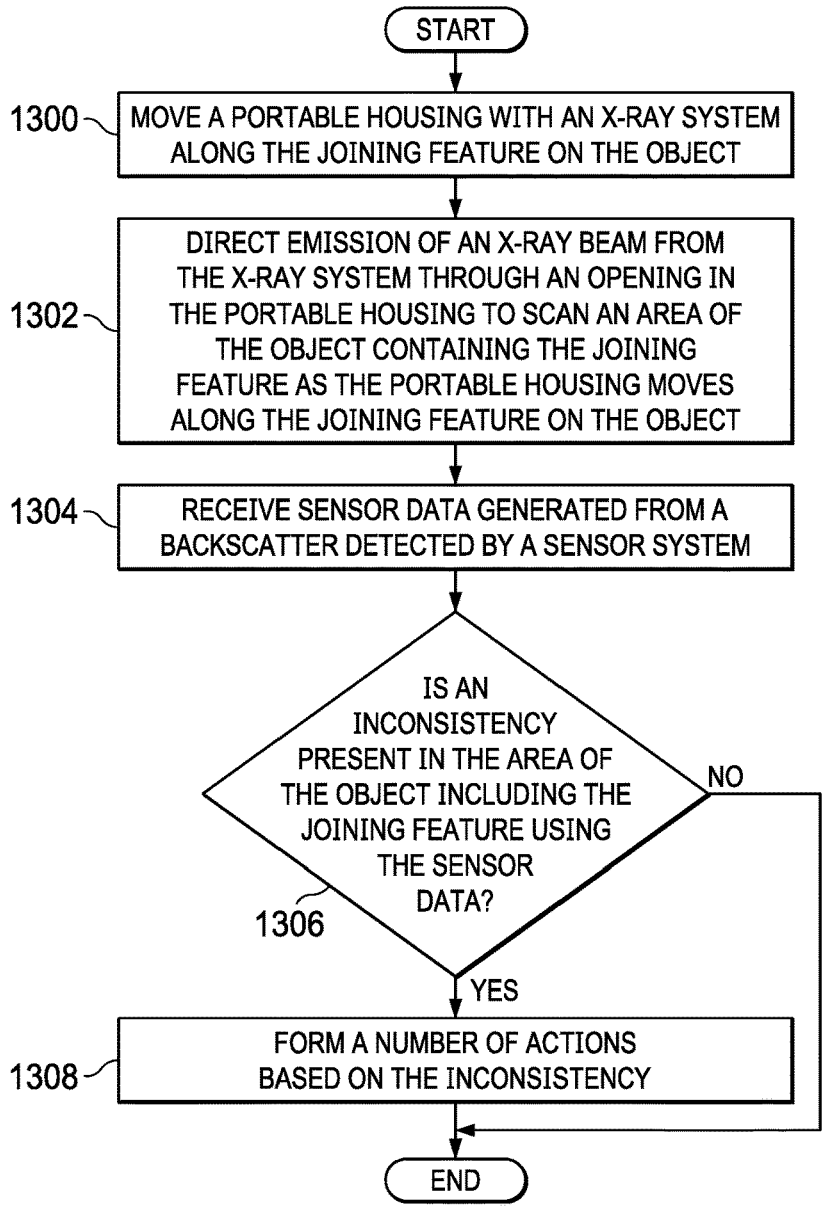
FIG. 13 is an illustration of a flowchart of a process for inspecting a joining feature on an object in accordance with an illustrative embodiment.

Turning next to FIG. 13, an illustration of a flowchart of a process for inspecting a joining feature on an object is depicted in accordance with an illustrative embodiment. The process in FIG. 13 can be implemented in hardware, software, or both. When implemented in software, the process can take the form of program code that is run by one of more processor units located in one or more hardware devices in one or more computer systems. For example, the process can be implemented in component such as controller 126 in computer 124 in FIG. 1, controller 224 in computer system 242 in FIG. 2, and using program code in tablet computer 616 in FIG. 6.

The process begins by moving a portable housing with an x-ray system along the joining feature on the object (operation 1300). In operation 1300, the portable housing can be moved using a mobility system. The mobility system can have a propulsion system and mobility components. For example, the mobility system can be an electric motor and wheels.

The process directs emission of an x-ray beam from the x-ray system through an opening in the portable housing to scan an area of the object containing the joining feature as the portable housing moves along the joining feature on the object (operation 1302).

The process receives sensor data generated from a backscatter detected by a sensor system (operation 1304). In operation 1304, the backscatter is generated in response the x-ray beam encountering the area of the object including the joining feature.

A determination is made as to whether an inconsistency is present in the area of the object including the joining feature using the sensor data (operation 1306). If an inconsistency is not present, the process terminates.

Otherwise, the process forms a number of actions based on the inconsistency (operation 1308). With the process terminating thereafter. In operation 1304, the number of actions can be selected from at least one of sending a message indicating the presence of the inconsistency, identifying the location of the inconsistency on the object, reworking the object, discarding the object, or some other suitable action.

Figure 14:
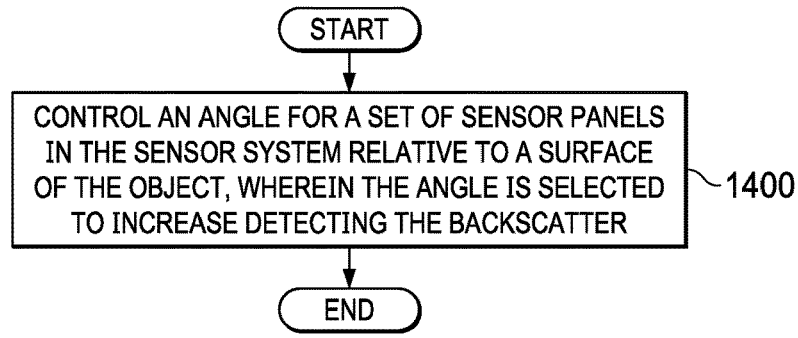
FIG. 14 is an illustration of a flowchart of a process for controlling a configuration of a sensor system in accordance with an illustrative embodiment.

Turning to FIG. 14, an illustration of a flowchart of a process for controlling a configuration of a sensor system is depicted in accordance with an illustrative embodiment. The operation depicted in this flowchart is an example of an additional operation that can be performed in addition to the operations depicted in FIG. 13.

The process controls an angle for a set of sensor panels in the sensor system relative to a surface of the object, wherein the angle is selected to increase detecting the backscatter (operation 1400). The process terminates thereafter.

Figure 15:
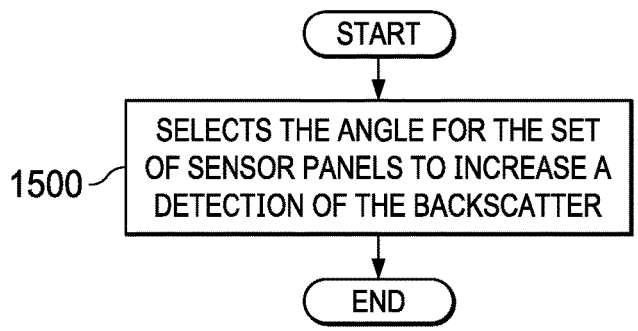
FIG. 15 is an illustration of a flowchart of a process for controlling a configuration of a sensor system in accordance with an illustrative embodiment.

With reference next to FIG. 15, an illustration of a flowchart of a process for controlling a configuration of a sensor system is depicted in accordance with an illustrative embodiment. The operation depicted in this flowchart is an example of an additional operation that can be performed in addition to the operations depicted in FIG. 13 and FIG. 14.

The process selects the angle for the set of sensor panels to increase a detection of the backscatter (operation 1500). The process terminates thereafter.

Figure 16:
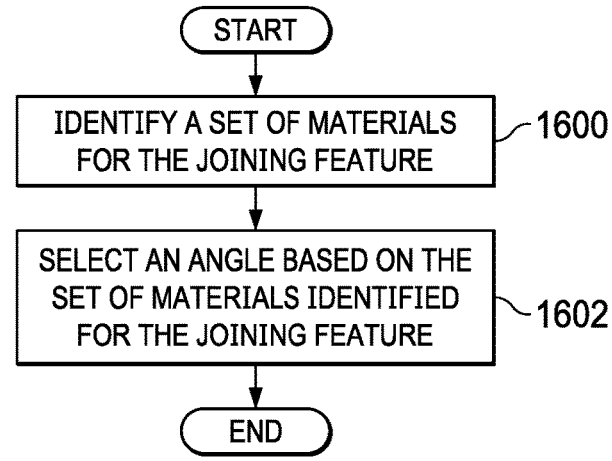
FIG. 16 is an illustration of a flowchart of a process for selecting an angle for a set of sensor panels in a sensor system in accordance with an illustrative embodiment.

Turning now to FIG. 16, an illustration of a flowchart of a process for selecting an angle for a set of sensor panels in a sensor system is depicted in accordance with an illustrative embodiment. The process depicted in FIG. 16 is an example of one implementation for operation 1500 in FIG. 15.

The process begins by identifying a set of materials for the joining feature (operation 1600). The process selects an angle based on the set of materials identified for the joining feature (operation 1602). The process terminates thereafter. In operation 1602, the angle can be identified from an angle database. The angle database can contain angles for joining features. These angles and the angle database can be selected for increasing backscatter detection. The angles can be determined using simulations or actual testing backscatter detection for different angles. Further, the database can also be for particular sizes and types of sensor panels. Sensor panels of different sizes and different types of sensors can have different angles.

Figure 17:
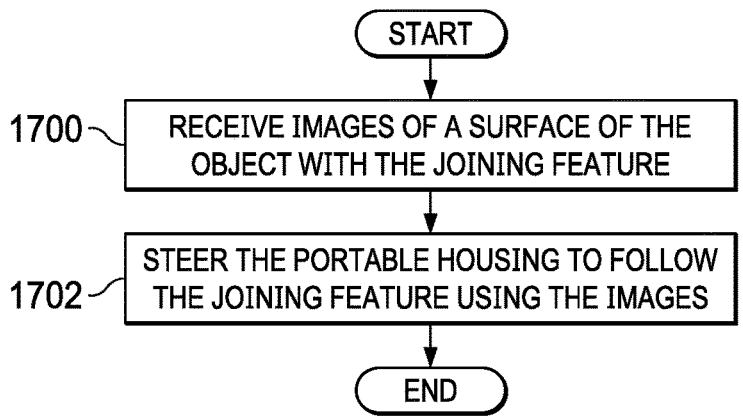
FIG. 17 is an illustration of a flowchart of a process for moving portable housing in accordance with an illustrative embodiment.

Turning next to FIG. 17, an illustration of a flowchart of a process for moving portable housing is depicted in accordance with an illustrative embodiment. The process illustrated in FIG. 17 is an example of one implementation for operation 1300 in FIG. 13.

The process begins by receiving images of a surface of the object with the joining feature (operation 1700). The process steers the portable housing to follow the joining feature using the images (operation 1702). The process terminates thereafter. In operation 1702, the movement of the portable housing can be steered by controlling the mobility system for the portable housing. The images can be used with a line following algorithm to determine a change in direction in movement for the portable housing. This change in direction can be made by controlling the mobility system for the portable housing.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 18:
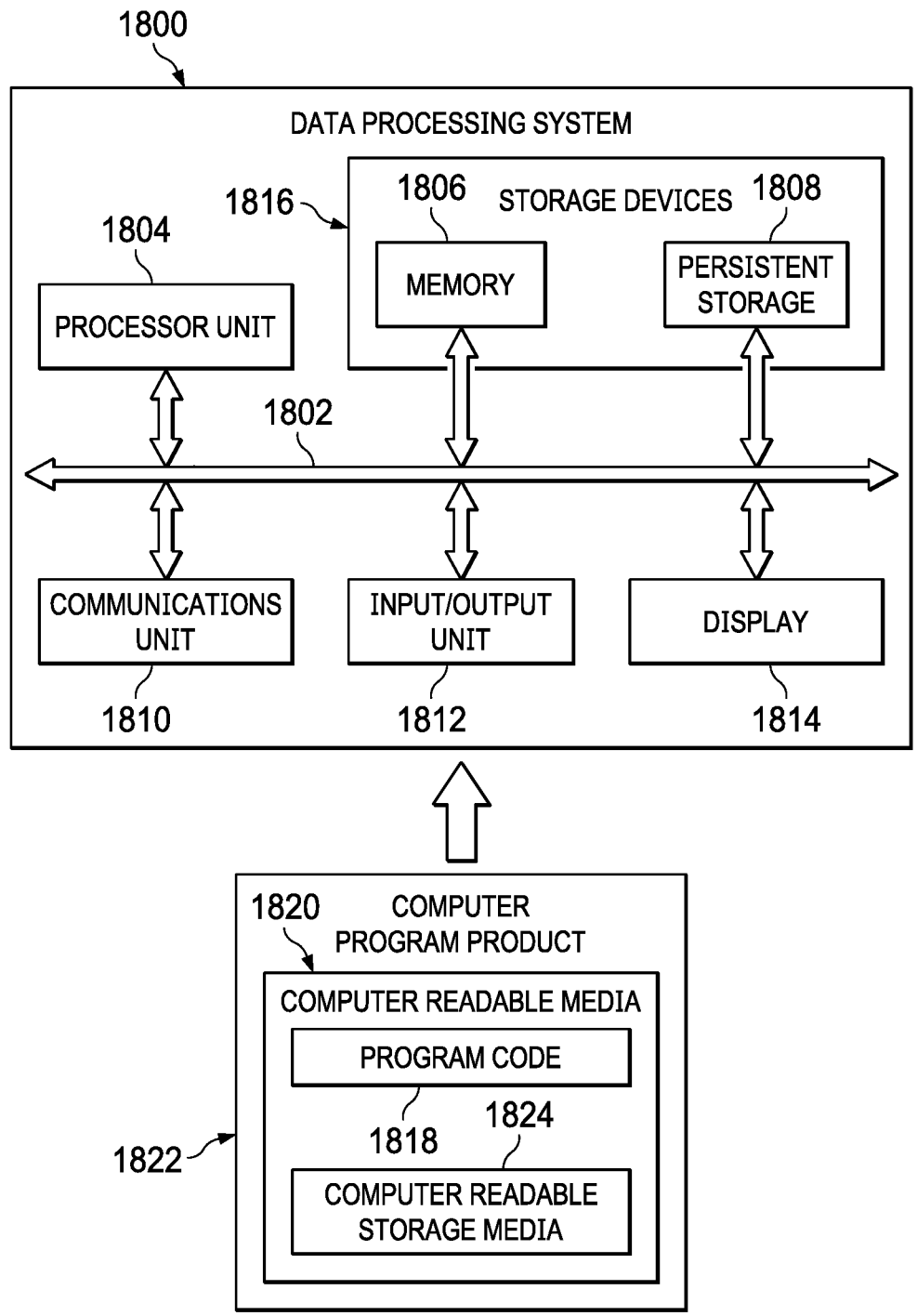
FIG. 18 is an illustration of a block diagram of a data processing system in accordance with an illustrative embodiment.

Turning now to FIG. 18, an illustration of a block diagram of a data processing system is depicted in accordance with an illustrative embodiment. Data processing system 1800 can be used to implement computer 124 in FIG. 1, computer system 242 in FIG. 2 and tablet computer 616 in FIG. 6. In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 takes the form of a bus system.

Processor unit 1804 serves to execute instructions for software that can be loaded into memory 1806. Processor unit 1804 includes one or more processors. For example, processor unit 1804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1804 can may be implemented using one or more heterogeneous processor systems in which a main processor is present with secondary processors on a single chip. As another illustrative example, processor unit 1804 can be a symmetric multi-processor system containing multiple processors of the same type on a single chip.

Memory 1806 and persistent storage 1808 are examples of storage devices 1816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1816 may also be referred to as computer-readable storage devices in these illustrative examples. Memory 1806, in these examples, can be, for example, a random-access memory or any other suitable volatile or non-volatile storage device. Persistent storage 1808 can take various forms, depending on the particular implementation.

For example, persistent storage 1808 may contain one or more components or devices. For example, persistent storage 1808 can be a hard drive, a solid-state drive (SSD), a flash memory, a rewritable optical disk, a rewritable magnetic tape, or some combination of the above. The media used by persistent storage 1808 also can be removable. For example, a removable hard drive can be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that can be connected to data processing system 1800. For example, input/output unit 1812 can provide a connection for user input through at least one of a keyboard, a mouse, or some other suitable input device. Further, input/output unit 1812 can send output to a printer. Display 1814 provides a mechanism to display information to a user.

Instructions for at least one of the operating system, applications, or programs can be located in storage devices 1816, which are in communication with processor unit 1804 through communications framework 1802. The processes of the different embodiments can be performed by processor unit 1804 using computer-implemented instructions, which can be located in a memory, such as memory 1806.

These instructions are program instructions and are also referred to as program code, computer usable program code, or computer-readable program code that can be read and executed by a processor in processor unit 1804. The program code in the different embodiments can be embodied on different physical or computer-readable storage media, such as memory 1806 or persistent storage 1808.

Program code 1818 is located in a functional form on computer-readable media 1820 that is selectively removable and can be loaded onto or transferred to data processing system 1800 for execution by processor unit 1804. Program code 1818 and computer-readable media 1820 form computer program product 1822 in these illustrative examples. In the illustrative example, computer-readable media 1820 is computer-readable storage media 1824.

Computer-readable storage media 1824 is a physical or tangible storage device used to store program code 1818 rather than a media that propagates or transmits program code 1818. Computer readable storage media 1818, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1818 can be transferred to data processing system 1800 using a computer-readable signal media. The computer-readable signal media are signals and can be, for example, a propagated data signal containing program code 1818. For example, the computer-readable signal media can be at least one of an electromagnetic signal, an optical signal, or any other suitable type of signal. These signals can be transmitted over connections, such as wireless connections, a optical fiber cable, a coaxial cable, a wire, or any other suitable type of connection.

Further, as used herein, "computer-readable media 1820" can be singular or plural. For example, program code 1818 can be located in computer-readable media 1820 in the form of a single storage device or system. In another example, program code 1818 can be located in computer-readable media 1820 that is distributed in multiple data processing systems. In other words, some instructions in program code 1818 can be located in one data processing system while other instructions in program code 1818 can be located in one data processing system. For example, a portion of program code 1818 can be located in computer-readable media 1820 in a server computer while another portion of program code 1818 can be located in computer-readable media 1820 located in a set of client computers.

The different components illustrated for data processing system 1800 are not meant to provide architectural limitations to the manner in which different embodiments can be implemented. In some illustrative examples, one or more of the components may be incorporated in or otherwise form a portion of, another component. For example, memory 1806, or portions thereof, can be incorporated in processor unit 1804 in some illustrative examples. The different illustrative embodiments can be implemented in a data processing system including components in addition to or in place of those illustrated for data processing system 1800. Other components shown in FIG. 18 can be varied from the illustrative examples shown. The different embodiments can be implemented using any hardware device or system capable of running program code 1818.

Figure 19:
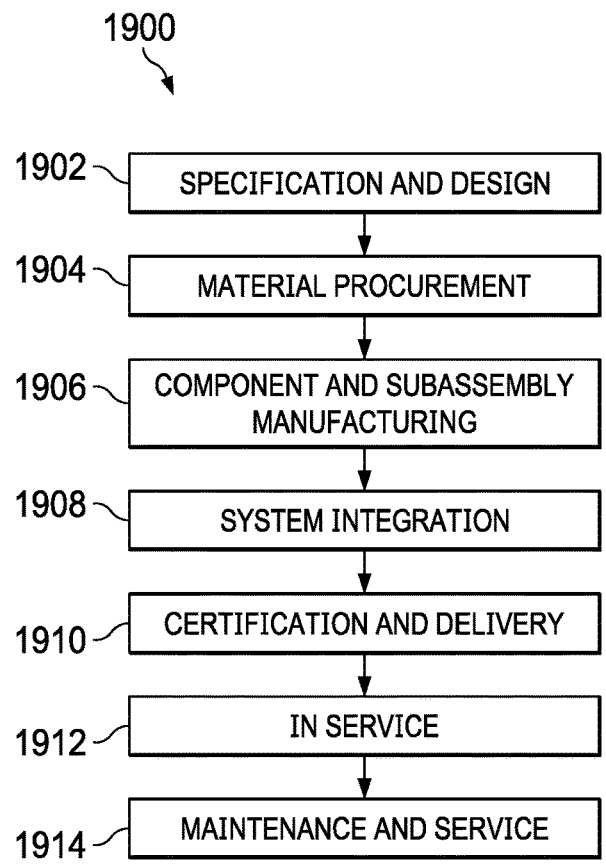
FIG. 19 is an illustration of an aircraft manufacturing and service method in accordance with an illustrative embodiment.
Figure 20:
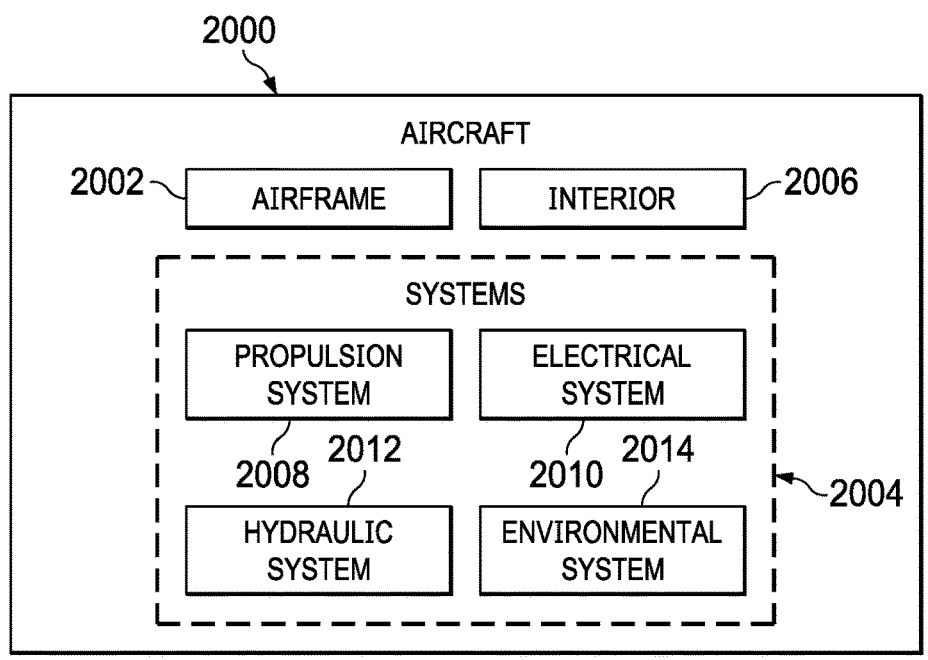
FIG. 20 is an illustration of a block diagram of an aircraft in accordance with an illustrative embodiment.

Illustrative embodiments of the disclosure may be described in the context of aircraft manufacturing and service method 1900 as shown in FIG. 19 and aircraft 2000 as shown in FIG. 20. Turning first to FIG. 19, an illustration of an aircraft manufacturing and service method is depicted in accordance with an illustrative embodiment. During preproduction, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 can go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of a block diagram of an aircraft is depicted in accordance with an illustrative embodiment. In this example, aircraft 2000 is produced by aircraft manufacturing and service method 1900 in FIG. 19 and may include airframe 2002 with a plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1900 in FIG. 19.

In one illustrative example, components or subassemblies produced in component and subassembly manufacturing 1906 in FIG. 19 can be fabricated or manufactured in a manner similar to components or subassemblies produced while aircraft 2000 is in service 1912 in FIG. 19. As yet another example, one or more apparatus embodiments, method embodiments, or a combination thereof can be utilized during production stages, such as component and subassembly manufacturing 1906 and system integration 1908 in FIG. 19. One or more apparatus embodiments, method embodiments, or a combination thereof may be utilized while aircraft 2000 is in service 1912, during maintenance and service 1914 in FIG. 19, or both. The use of a number of the different illustrative embodiments may substantially expedite the assembly of aircraft 2000, reduce the cost of aircraft 2000, or both expedite the assembly of aircraft 2000 and reduce the cost of aircraft 2000.

For example, radiation scanning system 201 in FIG. 2 can be used to perform inspections of aircraft 2000 during at least one of component and subassembly manufacturing 1906 or system integration 1908 to determine whether inconsistencies are present in joining features in aircraft 2000. As another example, mobile inspection unit 122 in FIG. 1 and mobile inspection unit 600 in FIGS. 6-11 can be used to perform inspections of aircraft 2000. For example, inspection of welds, bond lines, joints, the areas around the joints, and other joining features can be performed to determine whether inconsistencies are present.

As another example, radiation scanning system 201 can be used during maintenance and service 1914 to perform inspections of aircraft 2000 scheduled for routine maintenance or service which may include modification, reconfiguration, refurbishment, and other maintenance or service of aircraft 2000.

By using a mobile inspection unit that is portable, inspections of joining areas can be performed more easily for objects such as aircraft or ships as compared to current x-ray inspection systems.

Some features of the illustrative examples are described in the following clauses. These clauses are examples of features not intended to limit other illustrative examples.

Clause 1:
An x-ray scanning system comprising:
a portable housing having a chamber and a radiation shield;
a mobility system connected to the portable housing, wherein the mobility system attaches the portable housing to a surface of an object;
an x-ray system connected to the portable housing within the chamber, wherein the x-ray system is configured to emit an x-ray beam through an opening in the portable housing;
a set of sensor panels located within the chamber, wherein the set of sensor panels is moveable to a number of angles relative to the surface of the object, wherein the set of sensor panels generates sensor data in response to detecting backscatter received through the opening, wherein the backscatter is formed in response to the x-ray beam encountering the object; and a controller, wherein the controller operates to:
control the mobility system to move portable housing on the surface of the object, wherein the opening in the portable housing follows a joining feature on the object as the portable housing moves on the surface of the object;
control the x-ray system to direct he x-ray beam to scan an area of the object containing the joining feature as the portable housing moves on the surface of the object with the opening following the joining feature on the object;
move the set of sensor panels to a selected angle in the number of angles relative to the surface of the object to increase a detection of the backscatter through the opening; and
receive the sensor data generated from the backscatter detected by the set of sensor panels, wherein the backscatter is for the area of the object scanned, wherein the area includes the joining feature.

Clause 2:
The x-ray scanning system according to clause 1 further comprising:
a detachment detector configured to determine whether the portable housing is on the surface of the object and wherein the controller halts emission of the x-ray beam responsive to a determination that the portable housing is detached from the surface of the object.

Clause 3:
The x-ray scanning system according to clauses 1 or 2, wherein the detachment detector comprises at least one of a vacuum system, a proximity sensor attached to a wheel in the mobility system, a camera, or an ultrasonic sensor.

Clause 4:
The x-ray scanning system according to one of clauses 1, 2 or 3, wherein the x-ray system comprises:
an x-ray source that emits the x-ray beam; and
a rotatable wheel having a number of apertures, wherein the rotatable wheel is configured to rotate while the x-ray source generates the x-ray beam such that the number of apertures allows a portion of the x-ray beam to pass through the rotatable wheel, wherein the portion of the x-ray beam passes through an aperture in the number of apertures as a collimated x-ray beam that travels through the opening in the portable housing towards the surface of the object.

Clause 5:
The x-ray scanning system according to clause 4, wherein the mobility system moves the portable housing while the rotatable wheel rotates and while the x-ray beam is emitted through the opening in the portable housing towards the surface of the object and wherein the rotatable wheel is configured to rotate about an axis in which the portable housing moves in a direction along the axis such that a number of images is generated by the set of sensor panels using the backscatter detected in response to at least a portion of the x-ray beam encountering the object.

Clause 6:
The x-ray scanning system according to one of clauses 1, 2, 3, 4, or 5, wherein in moving the set of sensor panels to the selected angle in the number of angles relative to the surface of the object to increase the detection of the backscatter through the opening from the area of the object containing the joining feature, the controller operates to:
identify the selected angle for the joining feature using an angle database that increases the detection of the backscatter for the joining feature, wherein the angle database comprises joining features associated with angles for increasing a backscatter detection; and
move the set of sensor panels to the selected angle in the number of angles relative to the surface to increase the detection of the backscatter through the opening from the area of the object containing the joining feature using the selected angle identified for the joining feature using the angle database.

Clause 7:
The x-ray scanning system according to one of clauses 1, 2, 3, 4, 5, or 6, wherein the controller operates to:

move the set of sensor panels to the selected angle in the number of angles relative to the surface of the object to increase the detection of the backscatter through the opening.

Clause 8:

The x-ray scanning system according to one of clauses 1, 2, 3, 4, 5, 6, or 7 further comprising:
 a number of radiation shields on a backside of sensors in the set of sensor panels, wherein the number of radiation shields reduces the backscatter traveling through the set of sensor panels.

Clause 9:

The x-ray scanning system according to one of clauses 1, 2, 3, 4, 5, 6, 7, or 8, wherein the controller operates to:
 generate an image of the object including the joining feature from the sensor data; and
 determine whether an inconsistency is present in the object including the joining feature using the image.

Clause 10:

The x-ray scanning system according to one of clauses 1, 2, 3, 4, 5, 6, 7, 8, or 9 further comprising:
 a camera system that generates images of the surface of the object with the joining feature, wherein in controlling the mobility system to move the portable housing to follow the joining feature on the object, the controller steers the mobility system to move the portable housing to follow the joining feature using images of the of the surface of the object with the joining feature.

Clause 11:

The x-ray scanning system according to one of clauses 1, 2, 3, 4, 5, 6, 7, 8, 9, or 10, wherein the mobility system comprises:
 a propulsion system; and
 mobility components.

Clause 12:

The x-ray scanning system according to clause 11, wherein the mobility components comprise at least one of a wheel, a roller, a holonomic wheel, a magnetic roller, a vacuum roller, a magnetic wheel, a vacuum wheel, a magnetic holonomic wheel, a track, a vacuum holonomic wheel, or a magnetic track.

Clause 13:

The x-ray scanning system according to one of clauses 1, 2, 3, 4, 5, 6, 7, 8, 9, 10, 11, or 12, wherein the radiation shield comprises at least one of a lead wall, a lead-polyethylene-boron composite wall, a lead liner, or a lead-polyethylene-boron composite liner.

Clause 14:

A radiation scanning system comprising:
 a portable housing having a chamber;
 a mobility system connected to the portable housing;
 a radiation system located within the chamber of the portable housing, wherein the radiation system is configured to emit a radiation beam through an opening in the portable housing; and
 a sensor system located within the chamber of the portable housing, wherein the sensor system is configured to generate sensor data responsive to detecting backscatter received through the opening, wherein the backscatter is formed in response to the radiation beam encountering a joining feature on an object;
 a controller that operates to:
 control the mobility system to move the portable housing on a surface of the object, wherein the opening in the portable housing follows the joining feature on the object as the portable housing moves on the surface of the object;
 control the radiation system to direct the radiation beam through the opening to scan an area of the object containing the joining feature as the portable housing moves on the surface of the object with the opening following the joining feature on the object;
 control a positioning of the sensor system within the chamber that increases the backscatter detected by the sensor system through the opening; and
 receive the sensor data generated from the backscatter detected by the sensor system.

Clause 15:

The radiation scanning system according to clause 14, wherein the sensor system comprises:
 a set of sensor panels located within the chamber, wherein the set of sensor panels is moveable to a number of angles relative to the surface of the object, wherein the set of sensor panels generates the sensor data in response to detecting the backscatter formed in response to the radiation beam encountering the object.

Clause 16:

The radiation scanning system according to clause 15, wherein in controlling the positioning of the sensor system within the chamber that increases the backscatter detected by the sensor system through the opening, the controller operates to:
 move the set of sensor panels to a selected angle in the number of angles relative to the surface of the object to increase a detection of the backscatter through the opening from the area of the object containing the joining feature.

Clause 17:

The radiation scanning system according to clause 16, wherein in moving set of sensor panels to the selected angle in the number of angles relative to the surface of the object to increase the detection of the backscatter through the opening from the area of the object containing the joining feature, the controller operates to:
 identify the selected angle for the joining feature using an angle database that increases the detection of the backscatter for the joining feature, wherein the angle database comprises joining features associated with angles for increasing a backscatter detection; and
 move the set of sensor panels to the selected angle in the number of angles relative to the surface, wherein the detection of the backscatter through the opening from the area of the object containing the joining feature is increased.

Clause 18:

The radiation scanning system of according to one of clauses 15, 16, or 17, wherein a sensor panel in the set of sensor panels comprises sensors corresponding to pixels.

Clause 19:

The radiation scanning system according to clause 18 further comprising:
 a number of radiation shields on a backside of sensors in the set of sensor panels on an opposite side where the backscatter is detected by the sensors in the set of sensor panels, wherein the number of radiation shields reduces the backscatter traveling through the set of sensor panels.

Clause 20:

The radiation scanning system according to one of clauses 14, 15, 16, 17, 18, or 19, wherein the joining feature is one of a weld, a bond line, and a joint.

Clause 21:

The radiation scanning system according to one of clauses 14, 15, 16, 17, 18, 19, or 20 further comprising:

a detachment detector that operates to
determine whether the portable housing is on a surface of the object; and
wherein the controller halts emission of the radiation beam responsive to a determination that the portable housing is detached from the surface of the object.

Clause 22:

The radiation scanning system according to one of clauses 14, 15, 16, 17, 18, 19, 20, or 21, wherein the sensor system comprises:
a camera system that generates images of the surface of the object with the joining feature, wherein the controller steers the mobility system to move the portable housing to follow the joining feature using images of the of the surface of the object with the joining feature.

Clause 23:

The radiation scanning system according to one of clauses 14, 15, 16, 17, 18, 19, 20, 21, or 22, wherein the mobility system attaches the portable housing to the surface of the object.

Clause 24:

A method for inspecting a joining feature on an object, the method comprising:
moving a portable housing with an x-ray system along the joining feature on the object;
directing emission of an x-ray beam from the x-ray system through an opening in the portable housing to scan an area of the object containing the joining feature as the portable housing moves along the joining feature on the object;
receiving sensor data generated from a backscatter detected by a sensor system, wherein the backscatter is generated in response to the x-ray beam encountering the area of the object including the joining feature; and
determining whether an inconsistency is present in the area of the object including the joining feature using the sensor data.

Clause 25:

The method according to clause 24 further comprising:
controlling an angle for a set of sensor panels in the sensor system relative to a surface of the object, wherein the angle is selected to increase detecting the backscatter.

Clause 26:

The method according to clause 25 further comprising:
selecting the angle for the set of sensor panels to increase a detection of the backscatter.

Clause 27:

The method according to clause 26, wherein selecting the angle for the set of sensor panels to increase the detection of the backscatter comprises:
identifying a set of materials for the joining feature; and
selecting the angle based on the set of materials identified for the joining feature.

Clause 28:

The method according to one of clauses 24, 25, 26, or 27, wherein moving the portable housing with the x-ray system along joining feature on the object comprises:
receiving images of a surface of the object with the joining feature; and
steering the portable housing to follow the joining feature using the images.

Clause 29:

The method according to one of clauses 24, 25, 26, 27, or 28, wherein the joining feature is one of a weld, a bond line, and a joint.

Thus, the illustrative embodiments provide a method, apparatus, system, and computer program product for inspecting joining features such as welds, joints, bonds, and other features in a location where two or more components are joined to each other. A portable housing with an x-ray system is moved along the joining feature on the object. The x-ray system is controlled to direct an x-ray beam through an opening in the portable housing to scan an area of the object containing the joining feature as the portable housing moves along the joining feature on the object. Sensor data generated from a backscatter detected by a sensor system is received. The backscatter is generated in response to the x-ray beam encountering the area of the object including the joining feature. A determination is made as to whether an inconsistency is present in the area of the object including the joining feature using the sensor data.

In one or more illustrative examples, the mobile inspection unit can operate in a manner that has increased or improved contrast in images generated from detecting backscatter. Additionally, one or more illustrative examples can also enable faster inspections with improved image quality.

Additionally, a portable mobile inspection unit can move automatically or can be moved by human operator to perform inspections. As result, increased flexibility is present in inspecting various structures.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An x-ray scanning system comprising:
a portable housing having a chamber and a radiation shield;
a mobility system connected to the portable housing, wherein the mobility system attaches the portable housing to a surface of an object;
an x-ray system connected to the portable housing within the chamber, wherein the x-ray system is configured to emit an x-ray beam through an opening in the portable housing;
a set of sensor panels located within the chamber, wherein the set of sensor panels is moveable to a number of angles relative to the surface of the object, wherein the set of sensor panels generates sensor data in response to detecting backscatter received through the opening, wherein the backscatter is formed in response to the x-ray beam encountering the object; and a controller, wherein the controller operates to:
  control the mobility system to move portable housing on the surface of the object, wherein the opening in the portable housing follows a joining feature on the object as the portable housing moves on the surface of the object;
  control the x-ray system to direct the x-ray beam to scan an area of the object containing the joining feature as the portable housing moves on the surface of the object with the opening following the joining feature on the object;
  move the set of sensor panels to a selected angle in the number of angles relative to the surface of the object to increase a detection of the backscatter through the opening; and
  receive the sensor data generated from the backscatter detected by the set of sensor panels, wherein the backscatter is for the area of the object scanned, wherein the area includes the joining feature.

2. The x-ray scanning system of claim 1 further comprising:
  a detachment detector configured to determine whether the portable housing is on the surface of the object and wherein the controller halts emission of the x-ray beam responsive to a determination that the portable housing is detached from the surface of the object.

3. The x-ray scanning system of claim 2, wherein the detachment detector comprises at least one of a vacuum system, a proximity sensor attached to a wheel in the mobility system, a camera, or an ultrasonic sensor.

4. The x-ray scanning system of claim 1, wherein the x-ray system comprises:
  an x-ray source that emits the x-ray beam; and
  a rotatable wheel having a number of apertures, wherein the rotatable wheel is configured to rotate while the x-ray source generates the x-ray beam such that the number of apertures allows a portion of the x-ray beam to pass through the rotatable wheel, wherein the portion of the x-ray beam passes through an aperture in the number of apertures as a collimated x-ray beam that travels through the opening in the portable housing towards the surface of the object.

5. The x-ray scanning system of claim 4, wherein the mobility system moves the portable housing while the rotatable wheel rotates and while the x-ray beam is emitted through the opening in the portable housing towards the surface of the object and wherein the rotatable wheel is configured to rotate about an axis in which the portable housing moves in a direction along the axis such that a number of images is generated by the set of sensor panels using the backscatter detected in response to at least a portion of the x-ray beam encountering the object.

6. The x-ray scanning system of claim 1, wherein in moving the set of sensor panels to the selected angle in the number of angles relative to the surface of the object to increase the detection of the backscatter through the opening from the area of the object containing the joining feature, the controller operates to:
  identify the selected angle for the joining feature using an angle database that increases the detection of the backscatter for the joining feature, wherein the angle database comprises joining features associated with angles for increasing a backscatter detection; and
  move the set of sensor panels to the selected angle in the number of angles relative to the surface to increase the detection of the backscatter through the opening from the area of the object containing the joining feature using the selected angle identified for the joining feature using the angle database.

7. The x-ray scanning system of claim 1, wherein the controller operates to:
  move the set of sensor panels to the selected angle in the number of angles relative to the surface of the object to increase the detection of the backscatter through the opening.

8. The x-ray scanning system of claim 1 further comprising:
  a number of radiation shields on a backside of sensors in the set of sensor panels, wherein the number of radiation shields reduces the backscatter traveling through the set of sensor panels.

9. The x-ray scanning system of claim 1, wherein the controller operates to:
  generate an image of the object including the joining feature from the sensor data; and
  determine whether an inconsistency is present in the object including the joining feature using the image.

10. The x-ray scanning system of claim 1 further comprising:
  a camera system that generates images of the surface of the object with the joining feature, wherein in controlling the mobility system to move the portable housing to follow the joining feature on the object, the controller steers the mobility system to move the portable housing to follow the joining feature using images of the of the surface of the object with the joining feature.

11. A radiation scanning system comprising:
  a portable housing having a chamber;
  a mobility system connected to the portable housing;
  a radiation system located within the chamber of the portable housing, wherein the radiation system is configured to emit a radiation beam through an opening in the portable housing; and
  a sensor system located within the chamber of the portable housing, wherein the sensor system is configured to generate sensor data responsive to detecting backscatter received through the opening, wherein the backscatter is formed in response to the radiation beam encountering a joining feature on an object;
  a controller that operates to:
  control the mobility system to move the portable housing on a surface of the object, wherein the opening in the portable housing follows the joining feature on the object as the portable housing moves on the surface of the object;
  control the radiation system to direct the radiation beam through the opening to scan an area of the object containing the joining feature as the portable housing moves on the surface of the object with the opening following the joining feature on the object;
  control a positioning of the sensor system within the chamber that increases the backscatter detected by the sensor system through the opening; and
  receive the sensor data generated from the backscatter detected by the sensor system.

12. The radiation scanning system of claim 11, wherein the sensor system comprises:
  a set of sensor panels located within the chamber, wherein the set of sensor panels is moveable to a number of angles relative to the surface of the object, wherein the set of sensor panels generates the sensor data in response to detecting the backscatter formed in response to the radiation beam encountering the object.

13. The radiation scanning system of claim 12, wherein in controlling the positioning of the sensor system within the chamber that increases the backscatter detected by the sensor system through the opening, the controller operates to:
move the set of sensor panels to a selected angle in the number of angles relative to the surface of the object to increase a detection of the backscatter through the opening from the area of the object containing the joining feature.

14. The radiation scanning system of claim 13, wherein in moving set of sensor panels to the selected angle in the number of angles relative to the surface of the object to increase the detection of the backscatter through the opening from the area of the object containing the joining feature, the controller operates to:
identify the selected angle for the joining feature using an angle database that increases the detection of the backscatter for the joining feature, wherein the angle database comprises joining features associated with angles for increasing a backscatter detection; and
move the set of sensor panels to the selected angle in the number of angles relative to the surface, wherein the detection of the backscatter through the opening from the area of the object containing the joining feature is increased.

15. The radiation scanning system of claim 12, wherein a sensor panel in the set of sensor panels comprises sensors corresponding to pixels.

16. The radiation scanning system of claim 11 further comprising:
a detachment detector that operates to
determine whether the portable housing is on a surface of the object; and
wherein the controller halts emission of the radiation beam responsive to a determination that the portable housing is detached from the surface of the object.

17. A method for inspecting a joining feature on an object, the method comprising:
moving a portable housing with an x-ray system along the joining feature on the object;
directing emission of an x-ray beam from the x-ray system through an opening in the portable housing to scan an area of the object containing the joining feature as the portable housing moves along the joining feature on the object;
receiving sensor data generated from a backscatter detected by a sensor system, wherein the backscatter is generated in response to the x-ray beam encountering the area of the object including the joining feature; and
determining whether an inconsistency is present in the area of the object including the joining feature using the sensor data.

18. The method of claim 17 further comprising:
controlling an angle for a set of sensor panels in the sensor system relative to a surface of the object, wherein the angle is selected to increase detecting the backscatter.

19. The method of claim 18 further comprising:
selecting the angle for the set of sensor panels to increase a detection of the backscatter.

20. The method of claim 19, wherein selecting the angle for the set of sensor panels to increase the detection of the backscatter comprises:
identifying a set of materials for the joining feature; and
selecting the angle based on the set of materials identified for the joining feature.

* * * * *

UNITED STATES PATENT AND TRADEMARK OFFICE
CERTIFICATE OF CORRECTION

| | |
|---|---|
| PATENT NO. | : 11,506,618 B1 |
| APPLICATION NO. | : 17/444811 |
| DATED | : November 22, 2022 |
| INVENTOR(S) | : Jeffrey A. Robideau et al. |

It is certified that error appears in the above-identified patent and that said Letters Patent is hereby corrected as shown below:

In the Claims

Column 28, Lines 29-30, correct "using images of the of the surface" to read -- using images of the surface --

Signed and Sealed this
Twenty-first Day of February, 2023

*Katherine Kelly Vidal*

Katherine Kelly Vidal
*Director of the United States Patent and Trademark Office*